(12) United States Patent
Chung et al.

(10) Patent No.: US 12,531,613 B2
(45) Date of Patent: Jan. 20, 2026

(54) ANTENNA DEVICE FOR BEAMFORMING AND WIRELESS COMMUNICATION METHOD USING THE SAME

(71) Applicant: SAMSUNG ELECTRONICS CO., LTD., Suwon-si (KR)

(72) Inventors: Jooik Chung, Suwon-si (KR); Byung-Wook Min, Seoul (KR); Youngjoo Lee, Seoul (KR); Junhyeok Yang, Suwon-si (KR); Joung Hyun Yim, Suwon-si (KR); Chanyoung Jeong, Suwon-si (KR); Michael Choi, Suwon-si (KR)

(73) Assignees: SAMSUNG ELECTRONICS CO., LTD., Suwon-si (KR); UIF (UNIVERSITY INDUSTRYFOUNDATION), YONSEIUNIVERSITY, Seoul (KR)

( * ) Notice: Subject to any disclaimer, the term of this patent is extended or adjusted under 35 U.S.C. 154(b) by 225 days.

(21) Appl. No.: 18/528,438

(22) Filed: Dec. 4, 2023

(65) Prior Publication Data

US 2024/0333352 A1    Oct. 3, 2024

(30) Foreign Application Priority Data

Mar. 29, 2023 (KR) .................. 10-2023-0041563
May 4, 2023 (KR) .................. 10-2023-0058781

(51) Int. Cl.
*H04B 7/06* (2006.01)
*H01Q 3/26* (2006.01)

(52) U.S. Cl.
CPC ............ *H04B 7/0617* (2013.01); *H01Q 3/26* (2013.01); *H04B 7/0602* (2013.01)

(58) Field of Classification Search
CPC ...... H04B 7/0617; H04B 7/0602; H01Q 3/26; H01Q 3/36

(Continued)

(56) References Cited

U.S. PATENT DOCUMENTS 7,508,343 B1   3/2009   Maloratsky et al.
8,159,394 B2   4/2012   Hayes et al.
(Continued)

FOREIGN PATENT DOCUMENTS

KR   10-1772206   8/2017
KR   10-2290591   8/2021

OTHER PUBLICATIONS

W.-T. Fang et al., "2.4-GHz Absorptive MMIC Switch for Switched Beamformer Application", IEEE Transactions on Microwave Theory and Technique, vol. 65, No. 10, Oct. 2017.

(Continued)

*Primary Examiner* — Fitwi Y Hailegiorgis
(74) *Attorney, Agent, or Firm* — MORGAN, LEWIS & BOCKIUS LLP

(57) ABSTRACT

An antenna device includes an antenna array including a plurality of first antenna elements, arranged in a 2-by-2 array, a plurality of second antenna elements arranged in a 2-by-2 array, a first switching circuit, a second switching circuit connected to the first switching circuit and the first antenna elements, a third switching circuit connected to the first switching circuit and the second antenna elements, and a processor connected to the switching circuits. The processor is configured to control at least one of the switching circuits to operate in a single mode, among the plurality of modes, based on a single beam pattern among a plurality of predetermined beam patterns and to feed power to the antenna array through the first switching circuit, the second (Continued)

switching circuit, and the third switching circuit, to transmit a signal having the beam pattern.

20 Claims, 19 Drawing Sheets

(58) Field of Classification Search
USPC ........................................................ 375/299
See application file for complete search history.

(56) References Cited

U.S. PATENT DOCUMENTS

| | | | |
|---|---|---|---|
| 11,082,102 | B2 | 8/2021 | Nagasaku |
| 11,239,572 | B2 * | 2/2022 | Hu .......................... H01Q 21/28 |
| 2021/0409087 | A1 | 12/2021 | Horn et al. |
| 2022/0149900 | A1 | 5/2022 | Llorens Del Rio et al. |

OTHER PUBLICATIONS

Wooyeol Choi, et al. "A V-band switched beam-forming antenna module using absorptive switch integrated with 4x4 Butler Matrix in 0.13-µm CMOS", IEEE Trans. Microw. Theory Tech., vol. 58, No. 12, pp. 4052-4059, Dec. 2010.

Ting-Yeuh Chin, et al. "A 25-GHz compact low-power phased-array receiver with continuous beam steering in CMOS technology," IEEE J. Solid-State Circuits, vol. 45, No. 11, pp. 2273-2282, Nov. 2010.

J. Park, et al. "A 28 Ghz CMOS Butler matrix for 5G mm-wave beamforming systems." Microw. Opt. Tech. Lett., vol. 62, No. 7, pp. 2499-2505, Mar. 2020.

Youngjoo Lee, et al. "A 28-GHz Butler Matrix based Switched Beam-Forming Network with Phase Inverting Switch for Dual-Port Excitation in 28-nm CMOS", IEEE MTT-S. Int. Microw. Symp. (IMS), 2022, pp. 1002-1005.

Mohamed Elkhouly, et al. "A G-Band Four-Element Butler Matrix in 0.13- µm SiGe BiCMOS Technology." IEEE J. Solid-State Circuits, vol. 49, No. 9, pp. 1916-1926, Sep. 2014 Int. Microw. Symp.

Q.-Y. Jiang, et al. "A 24-GHz Butler-Matrix-Based Switched Beamformer in GaAs", IEEE MTT-S. (Ims), 2021, pp. 534-537.

Berke Cetinoneri, et al. "An 8x8 Butler matrix in 0.13-µm CMOS for 5-6-GHz multibeam applications", IEEE Trans. Microw. Theory Tech., vol. 59, No. 2, pp. 295-301, Feb. 2011.

* cited by examiner

[FIG. 1]
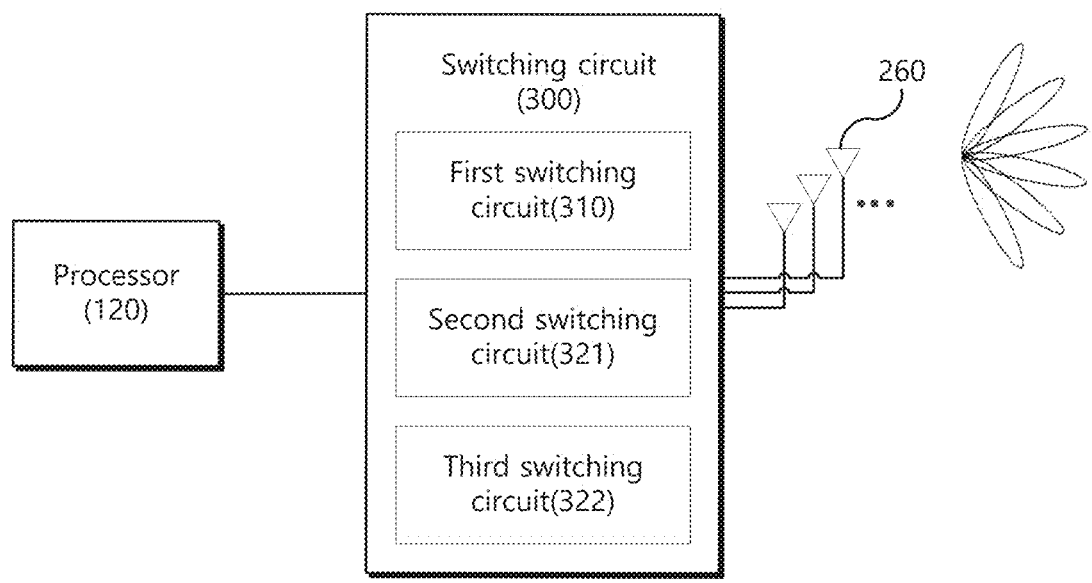

[FIG. 2]
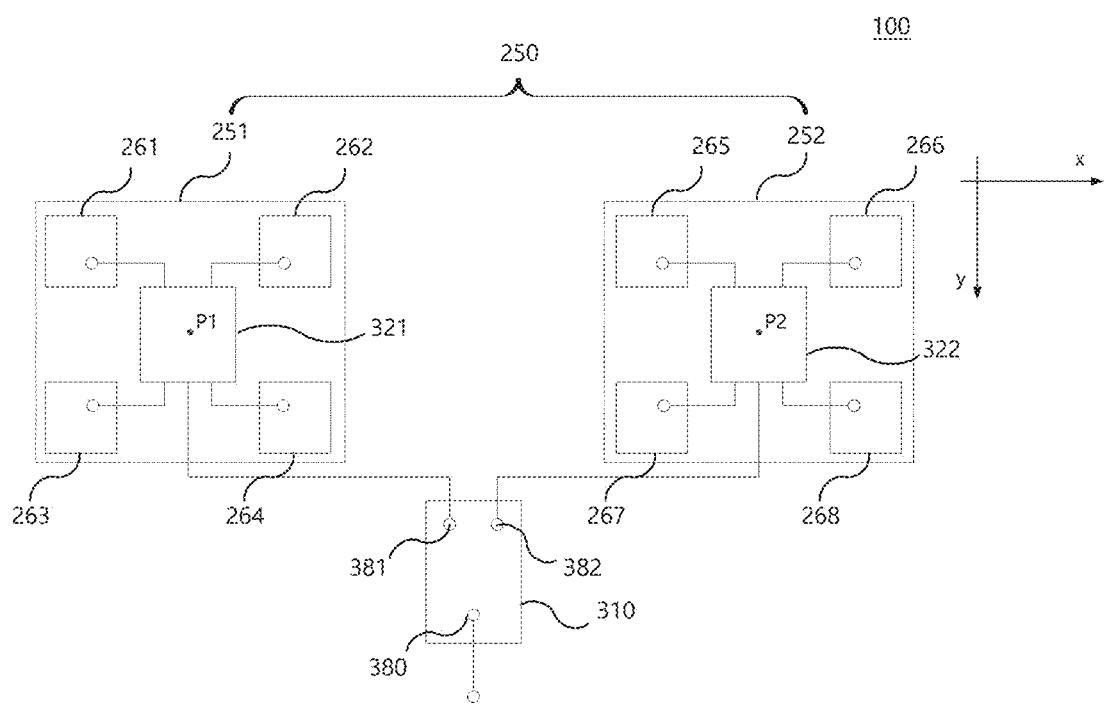

[FIG. 3a]
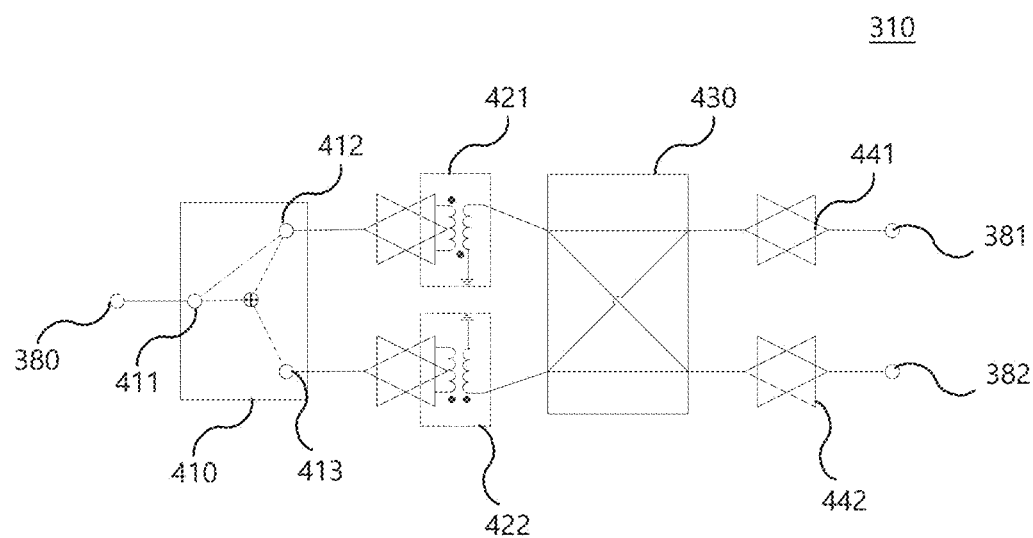

[FIG. 3b]
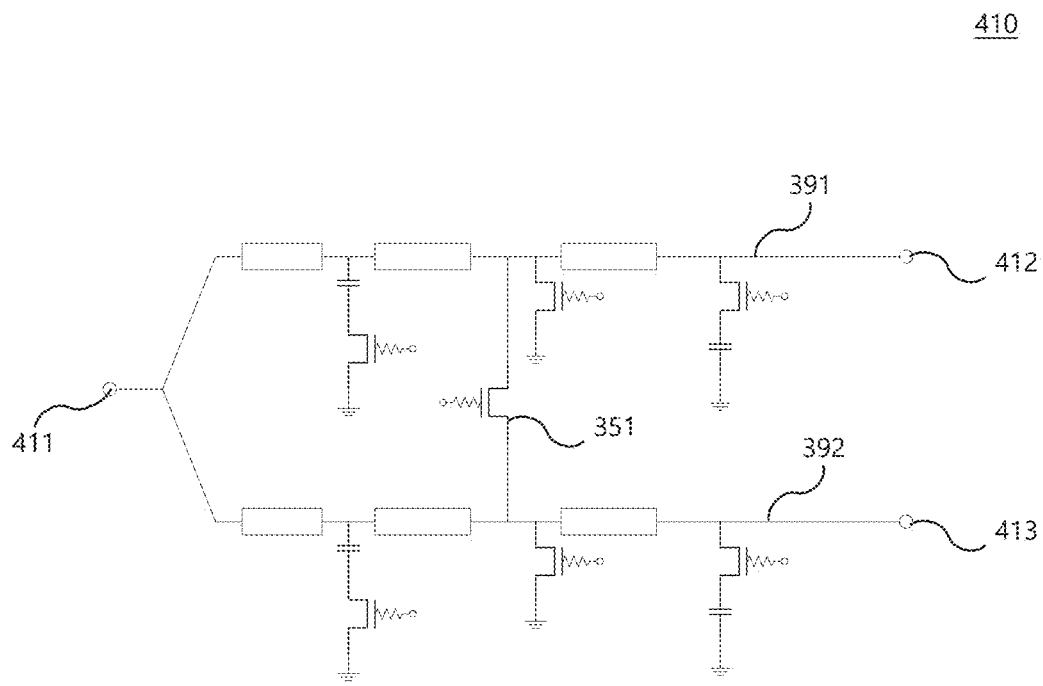

[FIG. 4a]
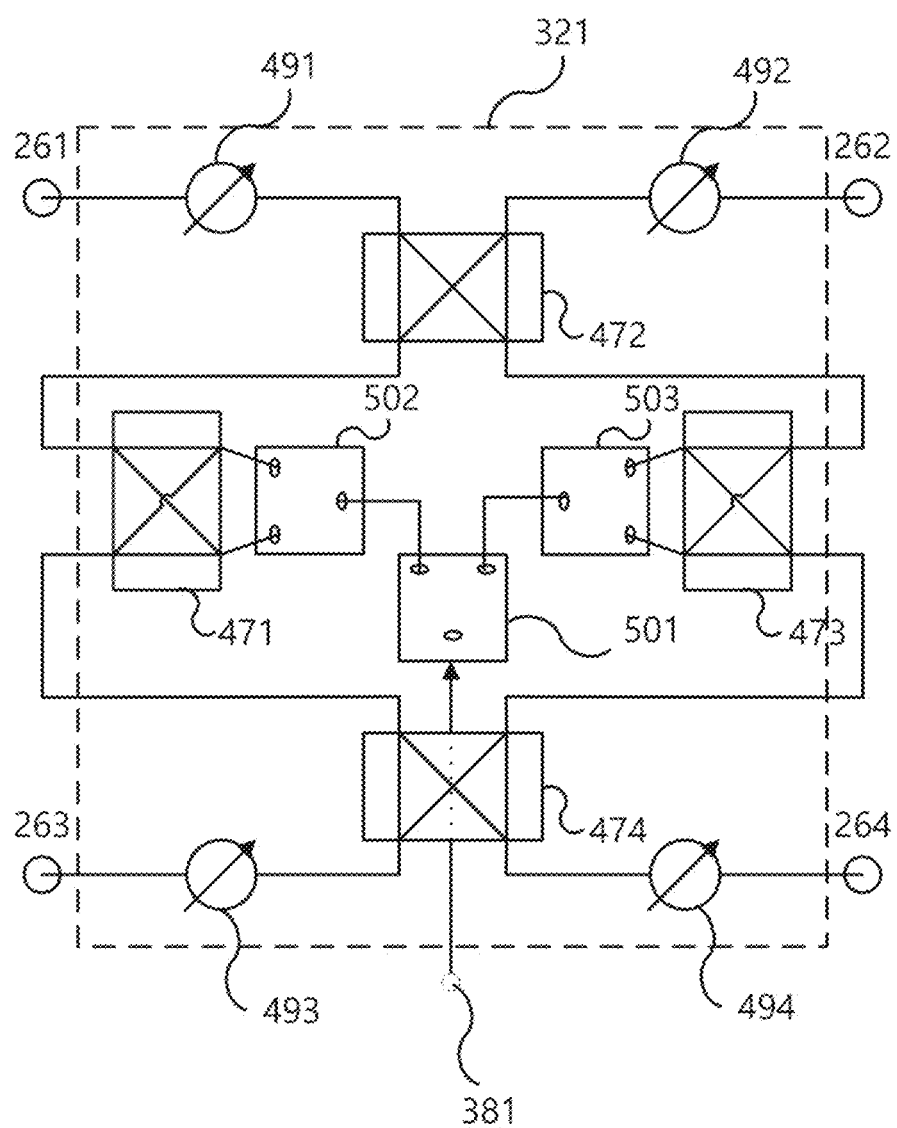

[FIG. 4b]
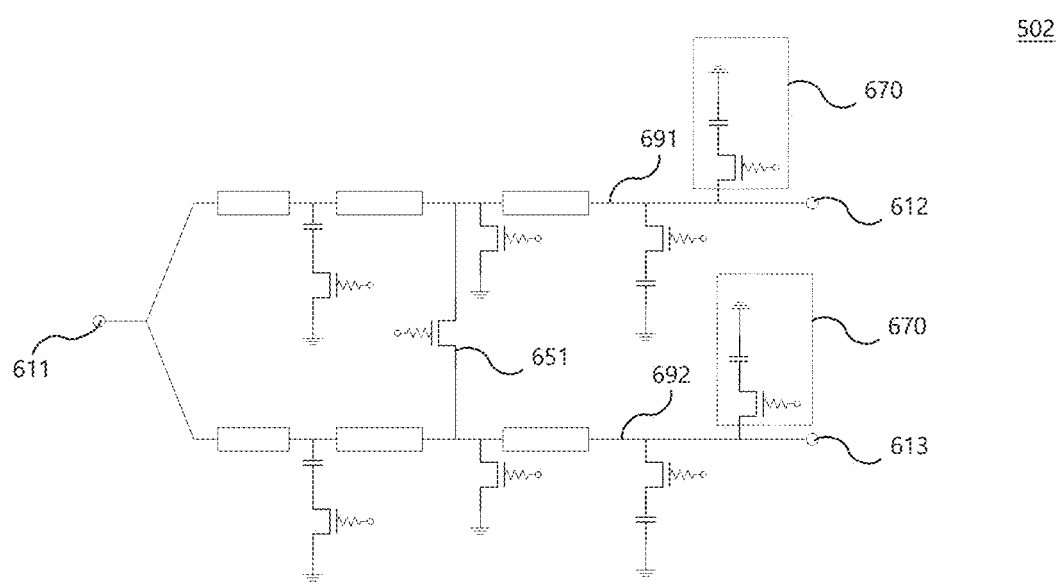

[FIG. 4c]
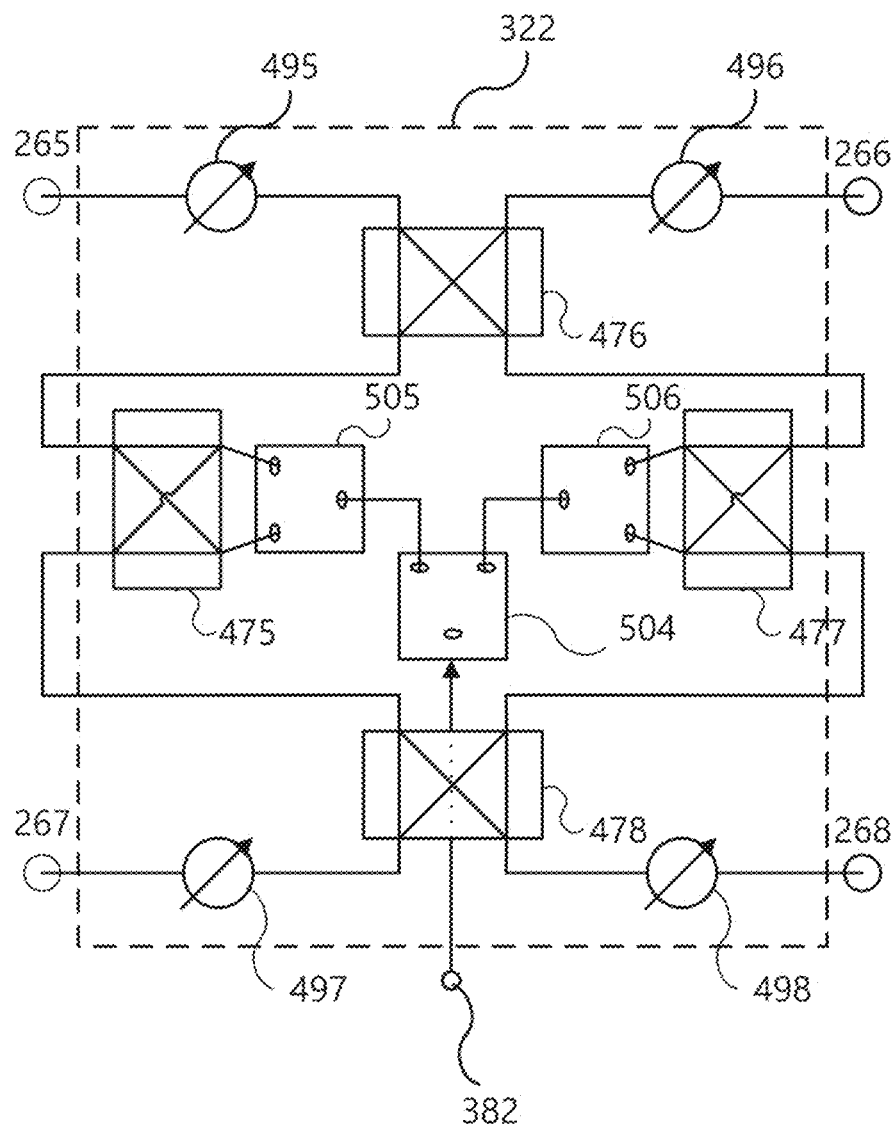

| First switching circuit state | Second switching circuit(third switching circuit) state | Phase shifter state | Beam pattern |
|---|---|---|---|
| 3L/1R | R(L)-U | CH1, CH3 | 1R(3L)+2U |
| 3L/1R | R(L)-D | CH1, CH3 | 1R(3L)+2D |
| 3L/1R | R(L)-UD | CH1, CH3 | 1R(3L)+M |
| 1L/3R | R(L)-U | CH2, CH4 | 3R(1L)+2U |
| 1L/3R | R(L)-D | CH2, CH4 | 3R(1L)+2D |
| 1L/3R | R(L)-UD | CH2, CH4 | 3R(1L)+M |
| 2L/2R | R(L)-U | - | 2R(2L)+2U |
| 2L/2R | R(L)-D | - | 2R(2L)+2D |
| 2L/2R | R(L)-UD | -/CH1, CH3/CH2, CH4 | 2R(2L)+M/1U/1D |

[FIG. 6]
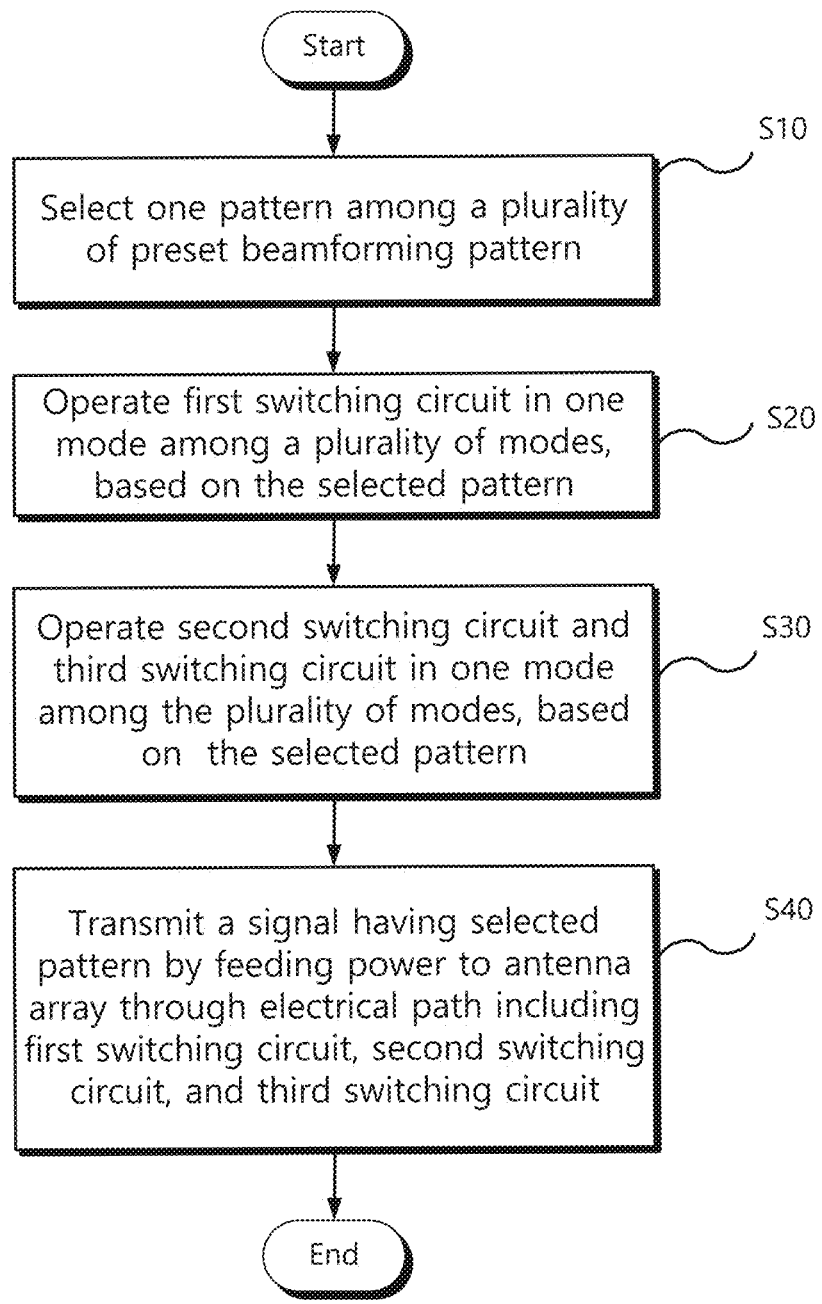

[FIG. 7a]
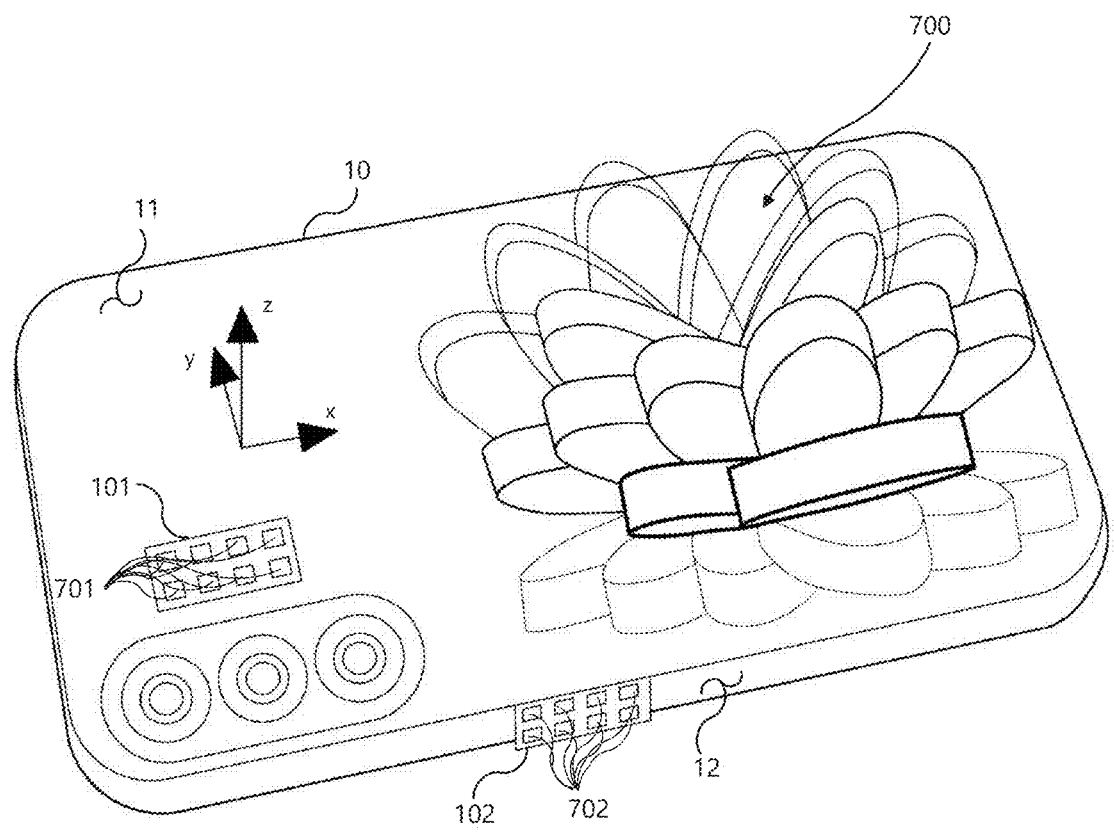

[FIG. 7b]
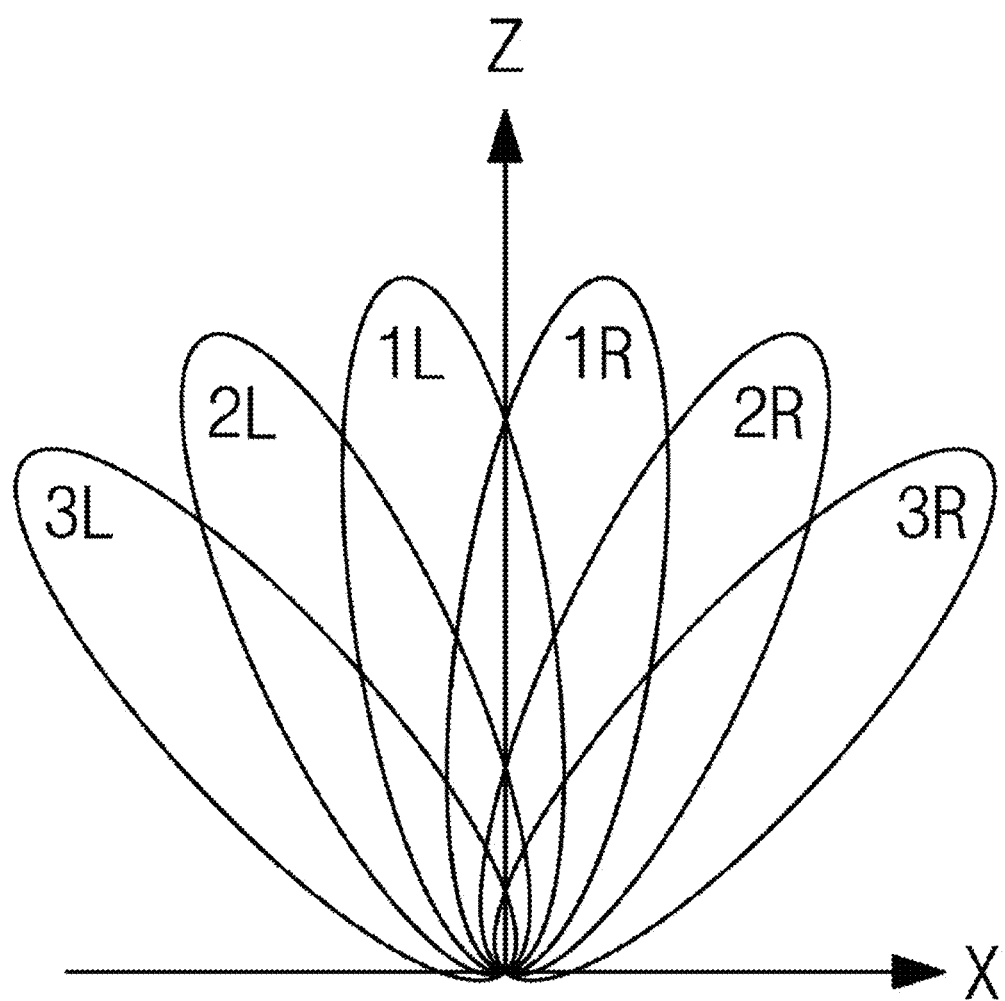

[FIG. 7c]
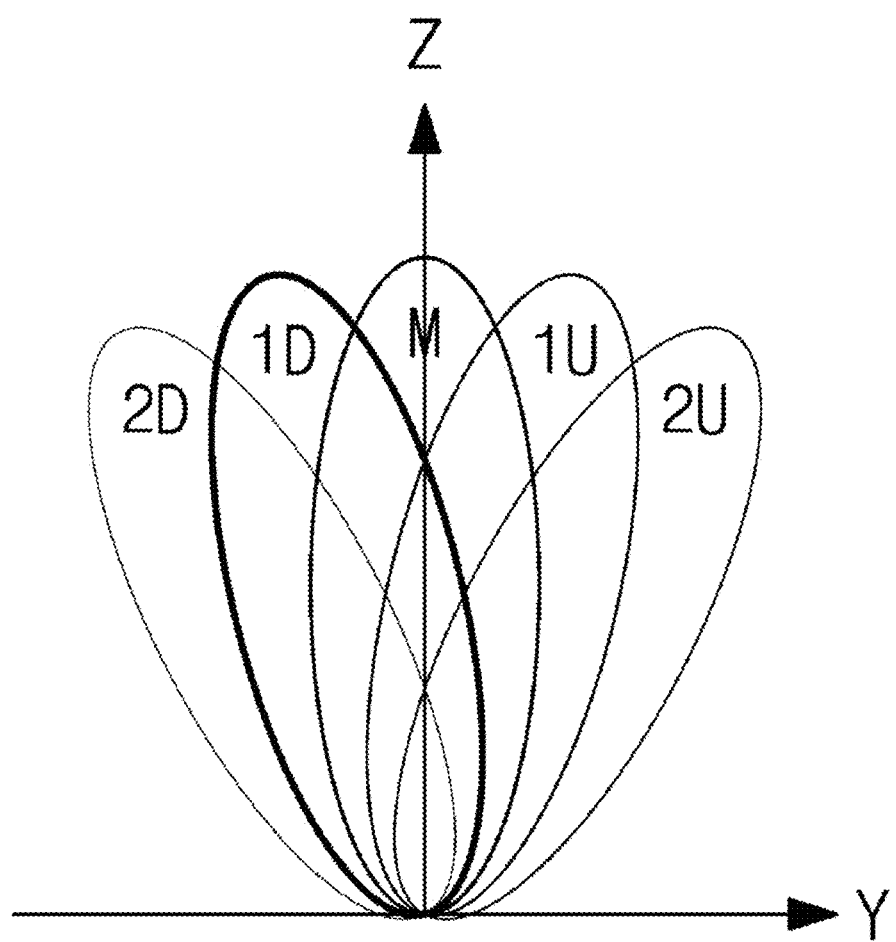

[FIG. 8a]
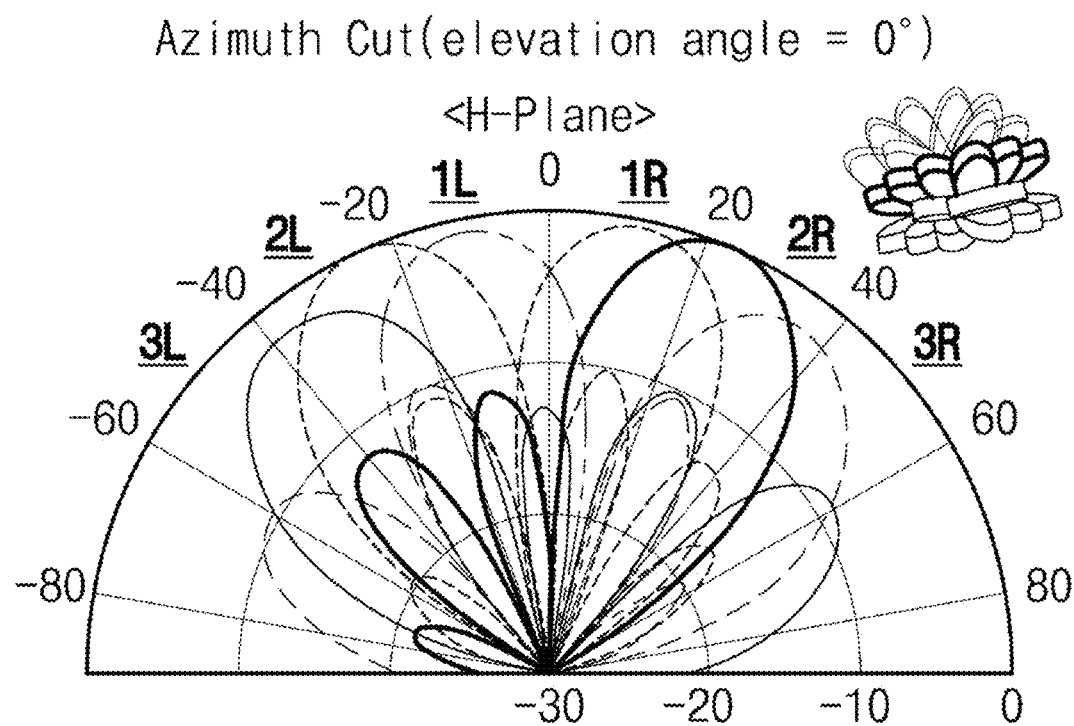

[FIG. 8b]
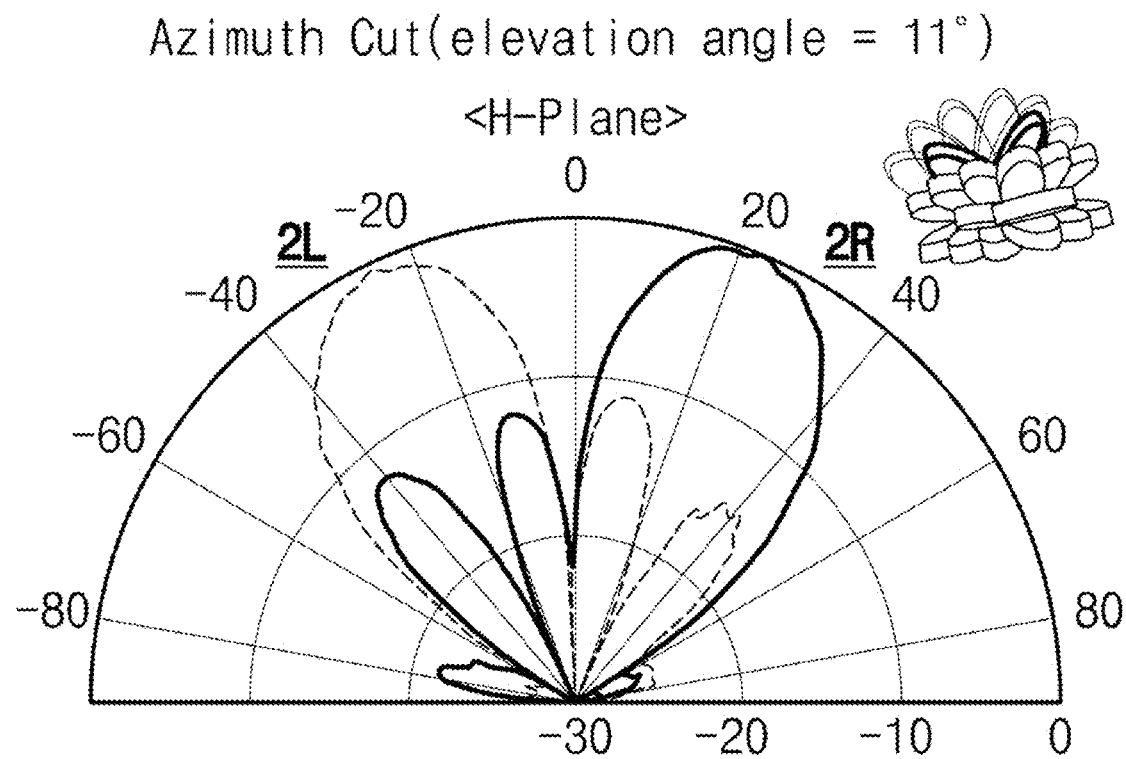

[FIG. 8c]
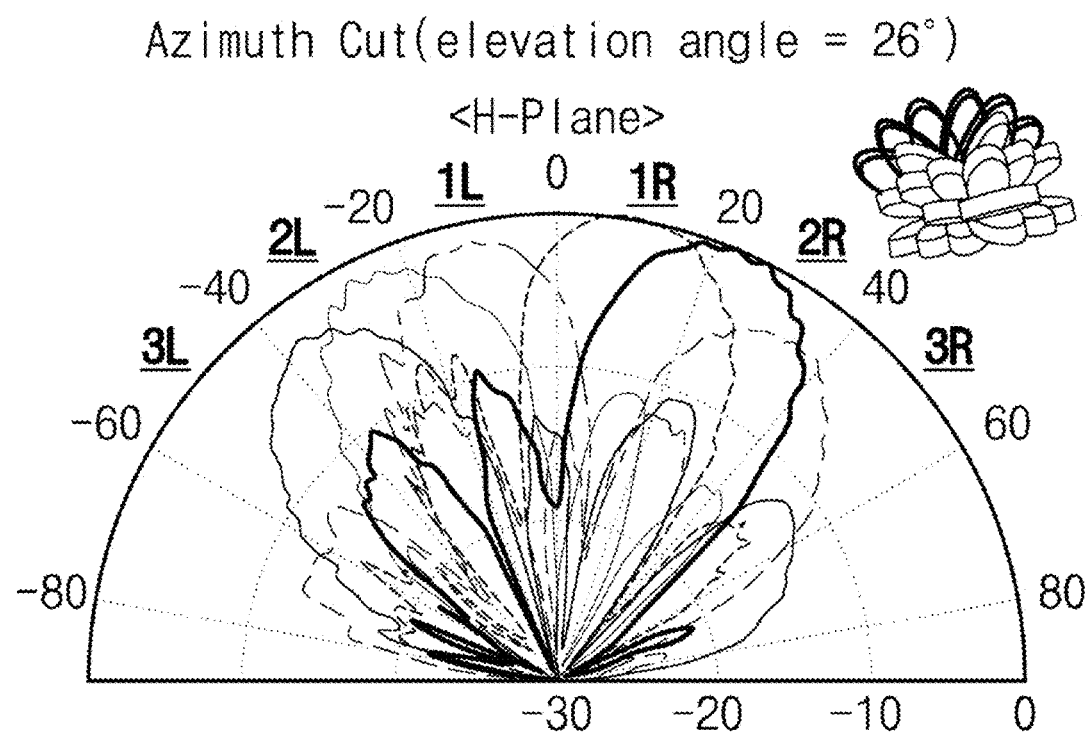

[FIG. 8d]
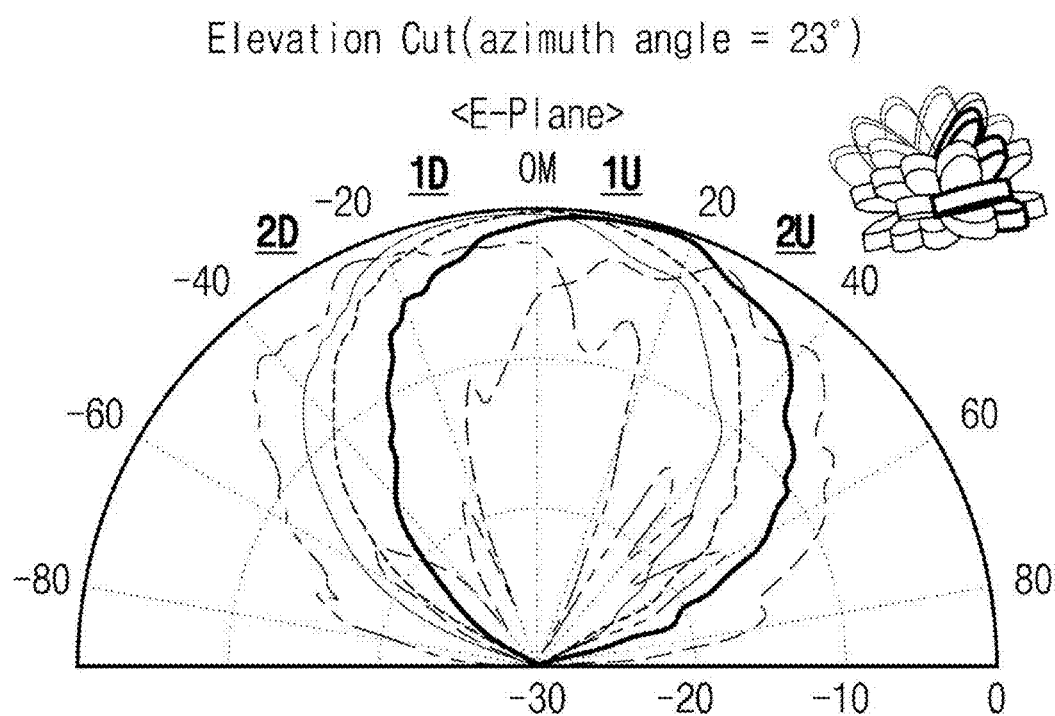

[FIG. 9a]
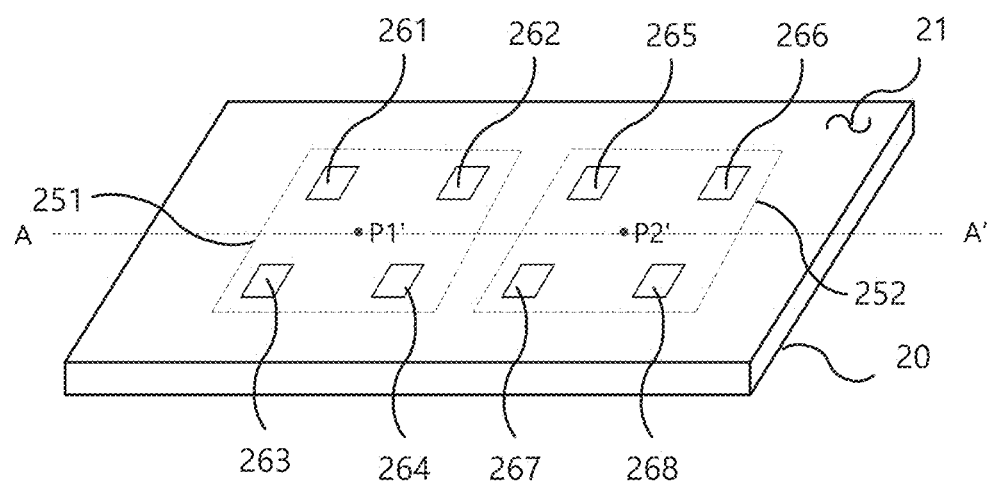

[FIG. 9b]
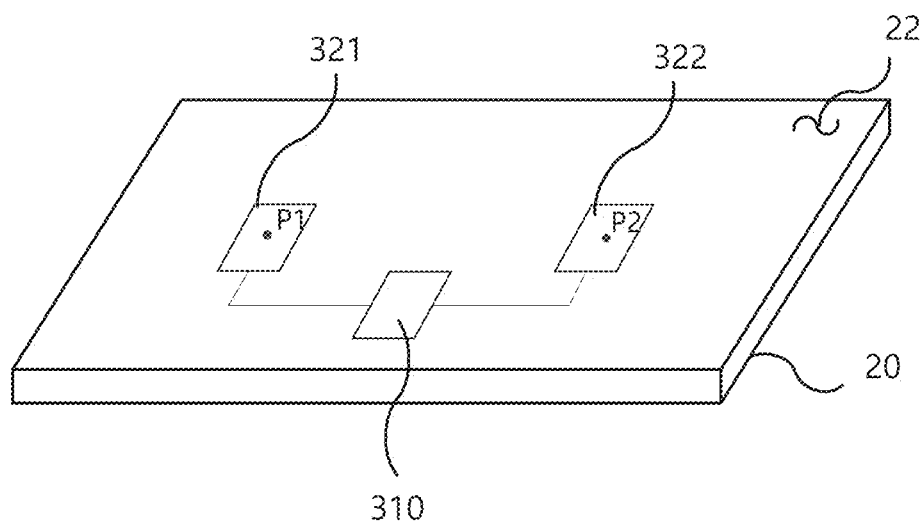

[FIG. 9c]
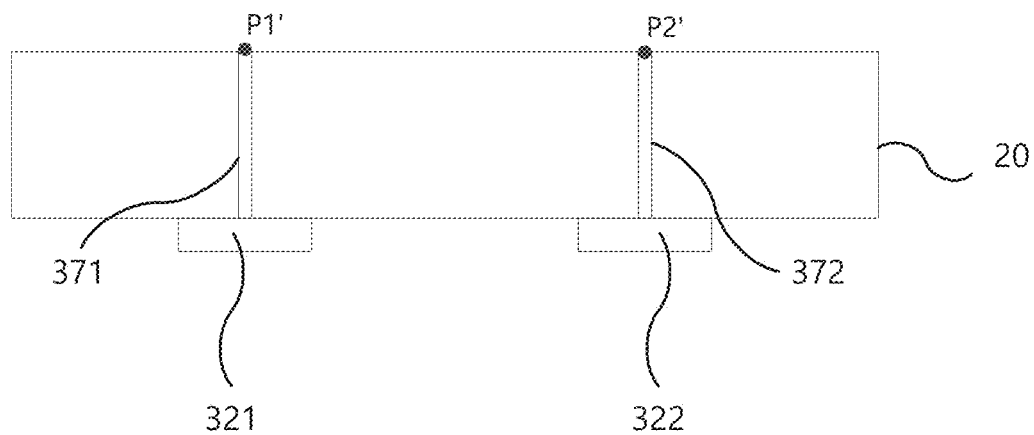

ANTENNA DEVICE FOR BEAMFORMING AND WIRELESS COMMUNICATION METHOD USING THE SAME

CROSS-REFERENCE TO RELATED APPLICATION(S)

This U.S. patent application claims priority under 35 U.S.C. § 119 to Korean Patent Applications No. 10-2023-0041563, filed on Mar. 29, 2023, and 10-2023-0058781, filed on May 4, 2023, in the Korean Intellectual Property Office, the disclosures of which are incorporated by reference in their entireties herein.

1. TECHNICAL FIELD

The present disclosure relates to antenna devices.

2. DISCUSSION OF RELATED ART

A cellular network is a telecommunications network where a link to and from end nodes is wireless and the network is distributed over land areas referred to as cells. Each of the cells may be served by at least one transceiver having a fixed location referred to as a base station. The base stations provide the cell with network coverage, which can be used for transmission of voice and data.

Fourth-generation (4G) is a broadband cellular technology that provides capabilities defined by the International Telecommunications Union (ITU) in the International Mobile Telecommunications Advanced (IMT-Advanced) standard. These capabilities include mobile web access, internet protocol (IP) telephony, gaming services, high-definition mobile television (TV), video conferencing, and three-dimensional (3D) TV.

A fifth-generation (5G) communication system has been developed to meet the demand for higher speeds, less latency, capacity for a larger number of connected devices, less interference, and better efficiency. In pursuit of the efforts, electronic devices including a plurality of antennas have been provided to transmit and receive various signals.

The 5G communication system is implemented in high frequency millimeter wave (mmWave) bands to accomplish higher data rates. To decrease propagation loss of the radio waves and increase the transmission distance, beamforming, massive multiple-input multiple-output (MIMO), array antenna, analog beamforming, large-scale antenna techniques are used in 5G communication systems.

There are techniques used to perform beamforming of an antenna array. For example, a phase shifter may be disposed on a path connected to each antenna to adjust a phase of a signal transmitted to each antenna, or a signal having a specific phase difference is transmitted to each antenna using a Butler matrix. However, these techniques have may have increased costs for phase control.

SUMMARY

At least one example embodiment provides an antenna device in which various beam patterns may be implemented through a feeding path including a reconfigurable switch.

According to an example embodiment, an antenna device includes an antenna array including a plurality of first antenna elements arranged in a 2-by-2 array, and a plurality of second antenna elements arranged in a 2-by-2 array, a first switching circuit, a second switching circuit connected to the first switching circuit and the first antenna elements, a third switching circuit connected to the first switching circuit and the second antenna elements, and a processor connected to the first switching circuit, the second switching circuit, and the third switching circuit. The processor is configured to control at least one of the first switching circuit, the second switching circuit, and the third switching circuit to operate in a single mode, among a plurality of modes, based on a single beam pattern among a plurality of predetermined beam patterns and to feed power to the antenna array through the first switching circuit, the second switching circuit, and the third switching circuit, to transmit a signal having the beam pattern.

According to an example embodiment, an electronic device including an antenna device includes a printed circuit board, an antenna array disposed on a first surface of the printed circuit board, a first switching circuit, a second switching circuit, and a third switching circuit disposed on a second surface of the printed circuit board opposing the first surface, and a processor configured to control the first switching circuit, the second switching circuit, and the third switching circuit such that the antenna array transmits a signal having a single beam pattern, among a plurality of predetermined beam patterns. The antenna array includes a plurality of first antenna elements disposed in a 2-by-2 array, and a plurality of second antenna elements disposed in a 2-by-2 array. The first switching circuit is connected to the second switching circuit and the third switching circuit through a first reconfigurable switch, the second switching circuit is connected to the first antenna elements through a central point of the first antenna elements on the first surface, and the third switching circuit is connected to the second antenna elements through a central point of the second antenna elements on the first surface.

According to an example embodiment, a wireless communication method includes: selecting a single beam pattern, among a plurality of predetermined beam patterns; operating a first switching circuit in a single mode, among a plurality of modes, based on the selected beam pattern; operating a second switching circuit and a third switching circuit connected to the first switching circuit in a single mode, among the plurality of modes, based on the selected beam pattern; and feeding power to an antenna array through the first switching circuit, the second switching circuit, and the third switching circuit, to transmit a signal having the selected beam pattern. The plurality of modes may include a switch mode, in which an input terminal is connected to a single output terminal among a plurality of output terminals, and a divider mode in which the input terminal is connected to the plurality of output terminals. Each of the first switching circuit, the second switching circuit, and the third switching circuit outputs a combination of three or more different types of signals through the plurality of modes.

BRIEF DESCRIPTION OF DRAWINGS

The above and other aspects and features of the present disclosure will be more clearly understood from the following detailed description, taken in conjunction with the accompanying drawings.

FIG. 1 is a block diagram of an antenna device according to an example embodiment.

FIG. 2 is a circuit diagram illustrating a configuration of the antenna device of FIG. 1.

FIG. 3a is a circuit diagram illustrating a first switching circuit in the circuit configuration of FIG. 2.

FIG. 3b is a circuit diagram illustrating a first reconfigurable switch included in the first switching circuit of FIG. 3a.

FIG. 4a is a circuit diagram illustrating a second switching circuit in the circuit configuration of FIG. 2.

FIG. 4b is a circuit diagram illustrating a second reconfigurable switch included in the second switching circuit of FIG. 4a.

FIG. 4c is a circuit diagram illustrating a third switching circuit in the circuit configuration of FIG. 2.

FIG. 5 is a lookup table including states of components of an antenna device, based on beam patterns.

FIG. 6 is a flowchart illustrating an example of a method of transmitting a signal having a designated beam pattern by the antenna device of FIG. 1.

FIG. 7a is a diagram illustrating a configuration in which an antenna device according to example embodiments is disposed on an electronic device to transmit a signal having a single beam pattern, among a plurality of beam patterns.

FIG. 7b is a diagram illustrating that the plurality of beam patterns of FIG. 7a are formed with respect to a first axis.

FIG. 7c is a diagram illustrating that the plurality of beam patterns of FIG. 7a are formed with respect to a second axis.

FIG. 8a is a diagram illustrating beam patterns, formed to be perpendicular to a second axis, among the plurality of beam patterns of FIG. 7a.

FIG. 8b is a diagram illustrating beam patterns, formed to have a first angle with respect to a second axis, among the plurality of beam patterns of FIG. 7a.

FIG. 8c is a diagram illustrating beam patterns formed to have a second angle with respect to a second axis, among the plurality of beam patterns of FIG. 7a.

FIG. 8d is a diagram illustrating beam patterns, formed to have a third angle with respect to a first axis, among the plurality of beam patterns of FIG. 7a.

FIG. 9a is a diagram illustrating a first surface of a printed circuit board included in the antenna device of FIG. 1.

FIG. 9b is a diagram illustrating a second surface of a printed circuit board included in the antenna device of FIG. 1.

FIG. 9c is a cross-sectional view of the printed circuit board of FIG. 9a, taken along line A-A'.

DETAILED DESCRIPTION

Hereinafter, example embodiments will be described with reference to the accompanying drawings.

FIG. 1 is a block diagram of an antenna device according to an example embodiment.

Referring to FIG. 1, an antenna device 100 according to an example embodiment includes a processor 120, a switching circuit 300 connected to the processor 120, and an antenna 260.

The processor 120 may execute software (or a program) to control at least one component (for example, a hardware component or a software component) connected to the processor 120, and may perform various data processing operations or calculations. The processor 120 may include a central processing unit or a microprocessor, and may control the overall operation of the antenna device 100. Accordingly, it will be appreciated below that an operation performed by the antenna device 100 is performed under the control of the processor 120.

According to an example embodiment, the processor 120 establishes a first communication channel of a first band (for example, about 6 GHz to about 60 GHz) to be used for wireless communication with an external network, and may support 5G network communication through the established first communication channel. According to an embodiment, the external network is a 5G network defined by a third-generation partnership project (3GPP).

According to another embodiment, the processor 120 establishes a second communication channel of a second other band (for example, about 6 GHz or less), among bands to be used for wireless communication with an external network, and may support 5G network communication through the established second communication channel.

According to another embodiment, the processor 120 establishes a third communication channel of a third other band to be used for wireless communication with an external network that supports legacy network communication through the established third communication channel. In this case, the external network may be a legacy network including a second-generation (2G), 3G, 4G, or long term evolution (LTE) network.

The type and frequency band of network communication, supported by the processor 120, are not limited to those described above. However, an example will be described below, where the processor 120 supports 5G network communication having a frequency band of 6 GHz or more.

The switching circuit 300 may electrically connect the processor 120 and the antenna 260 to each other. For example, the switching circuit 300 may form an electrical path (or a feeding path) from the processor 120 to the antenna 260.

According to an example embodiment, the switching circuit 300 includes a first switching circuit 310, a second switching circuit 321, and a third switching circuit 322. For example, the switching circuit 300 may include a first switching circuit 310 dividing an input signal to the second switching circuit 321 and the third switching circuit 322. Also, the switching circuit 300 may include a second switching circuit 321 and a third switching circuit 322 transmitting a signal, input from the first switching circuit 310, to the antenna 260.

According to an example embodiment, the antenna 260 is formed as an antenna array including a plurality of antenna elements for performing beamforming. During transmission, the processor 120 may control phases of 5G Above6 RF signals to be transmitted to an external entity of the antenna device 100 (for example, a base station of a 5G network) through an antenna element using the switching circuit 300. During reception, the processor 120 may shift the phases of the 5G Above6 RF signals, received from the external entity of the antenna device 100, into the same or substantially the same phase using the switching circuit 300. Thus, the antenna device 100 may perform transmission to or reception from an external network through beamforming.

As described above, the processor 120 may control an electrical path (or a feeding path), connected to the antenna 260, using the switching circuit 300. Thus, the processor 120 may allow the antenna 260 to transmit a signal having a designated beam pattern.

Through the above-described configurations, the antenna device 100 according to example embodiments may reduce costs and power required to adjust a phase and a magnitude of a signal for each of the plurality of antenna elements included in the antenna 260.

FIG. 2 is a circuit diagram illustrating a configuration of the antenna device 100 of FIG. 1 according to an example embodiment.

Referring to FIG. 2, the antenna device 100 according to an example embodiment includes an antenna array 250 including a plurality of antenna elements 261 to 268.

According to an example embodiment, the antenna array 250 includes the plurality of antenna elements 261 to 268 arranged to form a directional beam. In this case, it will be appreciated that the antenna array 250 constitutes the antenna 260 of FIG. 1.

For example, the antenna array 250 may include a plurality of first antenna elements 251 arranged in a 2-by-2 array. In addition, the antenna array 250 may include a plurality of second antenna elements 252 arranged in a 2-by-2 array. As a result, the antenna array 250 may include a plurality of antenna elements 261 to 268 arranged in a 4-by-2 array.

However, the number and arrangement of antenna elements included in the antenna array 250 are not limited to the above example.

In an embodiment, the antenna device 100 includes a first switching circuit 310, a second switching circuit 321 connected to the first antenna elements 251, and a third switching circuit 322 connected to the second antenna elements 252. In an embodiment, the first switching circuit 310, the second switching circuit 321, and the third switching circuit 322 are electrically connected to the processor 120.

According to an example embodiment, the first switching circuit 310 is connected to the second switching circuit 321 and the third switching circuit 322.

For example, the first switching circuit 310 may include a plurality of output terminals 381 and 382, respectively connected to the second switching circuit 321 and the third switching circuit 322. For example, the first switching circuit 310 may include a first output terminal 381, connected to the second switching circuit 321, and a second output terminal 382 connected to the third switching circuit 322.

Accordingly, the first switching circuit 310 may output a signal, input through the input terminal 380, through at least a portion of the output terminal 381 and the second output terminal 382. For example, the first switching circuit 310 may output a first part of the signal to the second switching circuit 321 and a second part of the signal to the third switching circuit 322.

Furthermore, the first switching circuit 310 may be connected to the first antenna elements 251 through the second switching circuit 321. In addition, the first switching circuit 310 may be connected to the second antenna elements 252 through the third switching circuit 322.

The second switching circuit 321 may be disposed in a position (for example, P1) corresponding to a central point (or a center) of the first antenna elements 261 to 264. In addition, the third switching circuit 322 may be disposed in a position (for example, P2) corresponding to a central point (or a center) of the second antenna elements 265 to 268.

In an embodiment, the second switching circuit 321 is connected to the respective first antenna elements 261 to 264 through paths or wires having the same length. In an embodiment, the third switching circuit 322 is connected to the respective second antenna elements 265 to 268 through paths or wires of equal length.

In this case, each of the second switching circuit 321 and the third switching circuit 322 may be understood as, for example, a single pole 4-throw (SP4T) switch, but example embodiments are not limited thereto.

According to an example embodiment, the processor 120 feeds power to the antenna array 250 through an electrical path including the first switching circuit 310, the second switching circuit 321, and the third switching circuit 322.

For example, the processor 120 may feed power to the first antenna elements 251 through an electrical path including the first switching circuit 310 and the second switching circuit 321. In addition, the processor 120 may feed power to the second antenna elements 252 through an electrical path including the first switching circuit 310 and the third switching circuit 322.

Through the above-described configuration, the antenna device 100 according to example embodiments may significantly reduce a length of a feeding path from the switching circuits 321 and 322 to the plurality of antennal elements 261 to 268 included in the antenna array 251 and 252. As a result, the antenna device 100 according to an example embodiment may significantly reduce path loss caused by the feeding path.

The processor 120 may transmit and receive a signal having a specific beam pattern through the antenna array 250. For example, the processor 120 may control the plurality of antenna elements 261 to 268, included in the antenna array 250, such that the plurality of antenna elements 261 to 268 output signals having a constant phase difference.

To this end, the processor 120 may control a reconfigurable switch, included in each of the first switching circuit 310, the second switching circuit 321, and the third switching circuit 322, such that the reconfigurable switch operates in a single mode, among a plurality of modes.

For example, the processor 120 may operate the reconfigurable switch, included in the first switching circuit 310, in one of the plurality of modes. Thus, the processor 120 may control phases of signals output through the first switching circuit 310. For example, the processor 120 may operate the reconfigurable switch, included in the first switching circuit 310, in one of the plurality of modes such that elements disposed in a first direction (for example, an X-direction or horizontal direction), among the plurality of antenna elements 261 to 268, receive signals having a first phase difference.

In addition, the processor 120 may operate the reconfigurable switches, included in the second switching circuit 321 and the third switching circuit 322, in one of the plurality of modes. Thus, the processor 120 may control phases of signals output through the second switching circuit 321 and the third switching circuit 322. For example, the processor 120 may operate the reconfigurable switches, included in the second switching circuit 321 and the third switching circuit 322, in one of the plurality of modes such that elements disposed in a second direction (for example, a Y-direction or a vertical direction), among the plurality of antenna elements 261 to 268, receive signals having a second phase difference.

As described above, the processor 120 may control a reconfigurable switch, included in each of the switching circuits 310, 321, and 322, such that the reconfigurable switch operates in one of the plurality of modes. Thus, the processor 120 may transmit a signal having one of a plurality of beam patterns through the plurality of antenna elements 261 to 268 included in the antenna array 250.

Accordingly, the antenna device 100 according to an example embodiment may increase the number of beam patterns, which may be implemented through the antenna array 250, using the switching circuit 310, 321, and 322, each of which operates in a plurality of modes.

In addition, the antenna device 100 may increase a coverage of wireless communication through the antenna array 250.

FIG. 3a is a circuit diagram illustrating the first switching circuit 310 of FIG. 2 according to an example embodiment. The first switching circuit 310 includes a first reconfigurable switch 410. FIG. 3b is a circuit diagram illustrating the first reconfigurable switch 410 of FIG. 3a according to an example embodiment.

Referring to FIG. 3a, the first switching circuit 310 according to an example embodiment includes the first reconfigurable switch 410 operating in a plurality of modes, a balance-to-unbalance transformer (balun) 421 connected to a first output terminal 412 of the first reconfigurable switch 410, a balun 422 connected to a second output terminal 413 of the first reconfigurable switch 410, a first coupler 430, and bidirectional amplifiers 441 and 442. The reconfigurable switch 410 may operate in any one of the modes.

According to an example embodiment, the first reconfigurable switch 410 may operate in a plurality of modes to transmit a signal, input from the input terminal 380 of the first switching circuit 310 to an input terminal 411, to at least a portion of the first output terminal 412 and the second output terminal 413. For example, the first reconfigurable switch 410 may operate in one of the plurality of modes to transmit the signal.

For example, the first reconfigurable switch 410 may operate in a switch mode to transmit a signal, input to the input terminal 411, to one of the first output terminal 412 and the second output terminal 413. Also, the first reconfigurable switch 410 may operate in a divider mode to transmit a signal, input to the input terminal 411, to the first output terminal 412 and the second output terminal 413.

For example, referring to FIG. 3b, the first reconfigurable switch 410 may include a first path 391 (e.g., first wires) connected from the input terminal 411 to the first output terminal 412. Also, the first reconfigurable switch 410 may include a second path 392 (e.g., second wires) connected from the input terminal 411 to the second output terminal 413.

Also, the first reconfigurable switch 410 may include a plurality of transistors, resistors, and capacitors connected to the first path 391 and the second path 392.

According to an example embodiment, the processor 120 opens transistors connected to one of the first path 391 and the second path 392 of the first reconfigurable switch 410, and short-circuits or closes transistors connected to the other path. Thus, the first reconfigurable switch 410 may operate in a switch mode in which an input signal is transmitted to one of the first path 391 and the second path 392.

According to an embodiment, the processor 120 short-circuits both the plurality of transistors, respectively connected to the first path 391 and the second path 392. In this embodiment, the processor 120 may activate (or turn on) a division transistor 351 connected to the first path 391 and the second path 392. Thus, the first reconfigurable switch 410 may operate in a divider mode in which an input signal is transmitted after being divided across the first path 391 and the second path 392. In this case, for example, the first reconfigurable switch 410 may implement a Wilkinson power divider, but example embodiments are not limited thereto.

Referring to FIG. 3a, the first switching circuit 310 may include baluns 421 and 422 connected to the output terminals 412 and 413 of the first reconfigurable switch 410. In this case, the first balun 421 connected to the first output terminal 412 and the second balun 422 connected to the second output terminal 413 may be formed in opposite directions. In an embodiment, coils of the first balun 421 may be formed opposite directions from coils of the second balun 421.

Accordingly, when signals having the same phase are output through the first output terminal 412 and the second output terminal 413 of the first reconfigurable switch 410, signals having a phase difference of 180 degrees may be output through the first balun 421 and the second balun 422.

In addition, the first switching circuit 310 may include a first coupler 430 connected to the first reconfigurable switch 410 through baluns 421 and 422 and bidirectional amplifiers 441 and 442 connected to the first coupler 430. In this case, a signal output from the first coupler 430 may be transmitted to the first output terminal 381 and the second output terminal 382 through the bidirectional amplifiers 441 and 442.

According to an example embodiment, when receiving a signal from one of the first balun 421 and the second balun 422, the first coupler 430 may output the received signal and a signal having a phase difference of 90 degrees with respect to the received signal. For example, the first switching circuit 310 may output a signal having a phase of 0 degrees through the first output terminal 381, and may output a signal having a phase of −90 degrees through the second output terminal 382. As another example, the first switching circuit 310 may output a signal having a phase of −90 degrees through the first output terminal 381, and may output a signal having a phase of 0 degrees through the second output terminal 382.

According to another embodiment, when receiving signals from the first balun 421 and the second balun 422, the first coupler 430 may output signals having a phase difference of 180 degrees with respect to each other. For example, the first switching circuit 310 may output a signal having a phase of 0 degrees through the first output terminal 381, and may output a signal having a phase of −180 degrees through the second output terminal 382.

Accordingly, the first switching circuit 310 may output signals having a phase difference of 90 degrees with respect to each other, or signal having a phase difference of 180 degrees with each other, through the first output terminal 381 and the second output terminal 382.

As described above, the antenna device 100 according to an example embodiment outputs a plurality of output signals having a predetermined phase difference with respect to an input signal through the first reconfigurable switch 410 operating in a plurality of modes. Thus, the antenna device 100 according to an example embodiment may output a combination of three or more different types of signals from a signal having a specific phase.

Accordingly, the antenna device 100 according to an example embodiment may increase the number of beam patterns which may implemented through the antenna array 250. Also, the antenna device 100 may increase communication coverage through beamforming performed through the antenna array 250.

FIG. 4a is a circuit diagram illustrating the second switching circuit 321 of FIG. 2 according to an example embodiment. FIG. 4b is a circuit diagram illustrating a second reconfigurable switch included in the second switching circuit of FIG. 4a according to an example embodiment. FIG. 4c is a circuit diagram illustrating the third switching circuit 322 of FIG. 2 according to an example embodiment.

Referring to FIG. 4a, the second switching circuit 321 according to an example embodiment may be connected to first antenna elements 261 to 264 through at least one reconfigurable switch 502 and 503 and a plurality of second couplers 471 to 474, respectively. In addition, the antenna device 100 may further include a plurality of phase shifters 491 to 494 disposed between the second switching circuit 321 and the first antenna elements 261 to 264. In this case, the second switching circuit 321 may be referred to as a two-dimensional (2D) Butler matrix.

According to an example embodiment, the second switching circuit 321 includes a first sub-switch 501 connected to the first switching circuit 310, and a second sub-switch 502 and a third sub-switch 503 connected to the first sub-switch 501.

The processor 120 may transmit a signal, output from the first output terminal 381 of the first switching circuit 310, to the second sub-switch 502 or the third sub-switch 503 through the first sub-switch 501.

In this case, for example, the first sub-switch 501 may be referred to as a single pole double throw (SPDT) switch, but example embodiments are not limited thereto. In addition, the second sub-switch 502 and the third sub-switch 503 may be referred to as reconfigurable switches which may operate in a plurality of modes.

When a signal output from the first output terminal 381 is transmitted to the second sub-switch 502 through the first sub-switch 501, the processor 120 may control the second sub-switch 502 to operate in one of the plurality of modes.

As an example, the processor 120 may control the second sub-switch 502 to operate in a switch mode in which an input signal is output to a single output terminal, among a plurality of output terminals. In this case, the processor 120 may output an input signal to a single output terminal, among a plurality of output terminals of the second sub-switch 502, based on a designated beam pattern.

As another example, the processor 120 may control the second sub-switch 502 to operate in a divider mode in which an input signal is divided and then output to a plurality of output terminals. In this case, signals output through the plurality of output terminals may have the same phase. For example, the input signal may be divided into a first and second signals where the first signal is output to one of the output terminals and the second signal is output to the other of the output signals.

Referring to FIG. 4b together, the second sub-switch 502 according to an example embodiment includes a first path 691 (e.g., first wires), connected from an input terminal 611 to a first output terminal 612, and a second path 692 (e.g., second wires) output from the input terminal 611 to a second output terminal 613.

Also, the second sub-switch 502 may include a plurality of transistors, resistors, and capacitors connected to the first path 691 and the second path 692.

According to an example embodiment, the processor 120 opens transistors connected to one of the first path 691 and the second path 692 of the second sub-switch 502, and short-circuits or closes transistors connected to the other path. Thus, the second sub-switch 502 may operate in a switch mode in which an input signal is transmitted through one of the first path 691 and the second path 692.

According to another embodiment, the processor 120 short-circuits a plurality of transistors, respectively connected to the first path 691 and the second path 692. In this embodiment, the processor 120 may activate (or turn on) a division transistor 651 connected to the first path 691 and the second path 692. Thus, the second sub-switch 502 may operate in a divider mode in which the input signal is divided and transmitted across both the first path 691 and the second path 692. In this case, for example, the second sub-switch 502 may implement a Wilkinson power divider, but example embodiments are not limited thereto.

Furthermore, the second sub-switch 502 according to an example embodiment may further include at least one matching element 670 (e.g., a matching circuit) connected to the first path 691 and the second path 692. For example, the second sub-switch 502 may further include a plurality of matching elements 670 connected to the first path 691 and the second path 692 to ensure that the plurality of output terminals 612 and 613 have the same impedance, from a 2-1-th coupler 471.

Thus, the antenna device 100 according to example embodiments may significantly reduce reflection loss caused by reflection of a signal generated between a switch (for example, the second sub-switch 502) and a coupler (for example, the 2-1-th coupler 471).

According to an example embodiment, when a signal is transmitted to the second sub-switch 502 through the first sub-switch 501, the processor 120 may transmit a signal, transmitted to the first sub-switch 501, to the 2-1-th coupler 471 through the second sub-switch 502.

Further, the 2-1-th coupler 471 may output a signal, transmitted from the second sub-switch 502, as a plurality of signals having a designated phase difference. For example, when the second sub-switch 502 operates in a switch mode, the 2-1-th coupler 471 may output a signal, received from the second sub-switch 502, and a signal having a specific phase difference (for example, 90 degrees) with respect to the received signal.

As another example, when the second sub-switch 502 operates in a divider mode, the 2-1-th coupler 471 may output signals received from second sub-switch 502. In this case, the signals output from the 2-1-th coupler 471 may have the same phase difference.

Further, a 2-2-th coupler 472 and a 2-4-th coupler 474 may output the signal, received from the 2-1-th coupler 471, and a signal having a specific phase difference (for example, 90 degrees) with respect to the received signal.

For example, the 2-2-th coupler 472 may transmit the signal, received from the 2-1-th coupler 471, to a 1-1-th antenna element 261. In an embodiment, the 2-2-th coupler 472 transmits a signal, having the phase difference of 90 degrees with respect to the signal received from the 2-1-th coupler 471, to a 1-2-th antenna element 262.

In addition, the 2-4-th coupler 474 may transmit the signal, received from the 2-1-th coupler 471, to a 1-3-th antenna element 263. In an embodiment, the 2-4-th coupler 474 transmits a signal, having a phase difference of 90 degrees with respect to the signal received from the 2-1-th coupler 471, to a 1-4-th antenna element 264.

According to another embodiment, when a signal is transmitted to the third sub-switch 503 through the first sub-switch 501, the processor 120 may transmit the signal, transmitted from the first sub-switch 501 through the third sub-switch 503, to a 2-3-th coupler 473.

The processor 120 may control the third sub-switch 503 to operate in a switch mode, in which an input signal is output to a single terminal among a plurality of output terminals, or operates in a divider mode in which an input signal is divided and then output to a plurality of output terminals.

It will be appreciated that the configuration of the third sub-switch 503 is substantially the same as the above-described configuration of the second sub-switch 502. In addition, it will be appreciated that the operation of controlling the third sub-switch 503 by the processor 120 is substantially the same as the operation of controlling the second sub-switch 502 by the processor 120, as described above.

Therefore, descriptions of the configuration of the third sub-switch 503 and the operation of controlling the third sub-switch 503 will be omitted.

When the third sub-switch 503 operates in a switch mode, the 2-3-th coupler 473 may output a signal, output from the third sub-switch 503, and a signal having a specific phase difference (for example, 90 degrees) with respect to the received signal. In addition, when the third sub-switch 503 operates in a divider mode, the 2-3-th coupler 473 may receive signals having the same phase from the third sub-switch 503 and output the signals to have the same phase.

Furthermore, the signal transmitted from the first sub-switch 501 may be transmitted to the first antenna elements 261 to 264 through the 2-3-th coupler 473, the 2-2-th coupler 472, and the 2-4-th coupler 474.

According to an example embodiment, the processor 120 operates at least a portion (e.g., at least one) of the plurality of phase shifters 491 to 494 such that signals, transmitted to the first antenna elements 261 to 264, have a phase difference based on a specific beam pattern.

The processor 120 may control at least a portion of a first phase shifter (CH1) 491 and a second phase shifter (CH2) 492 such that signals, transmitted to the 1-1-th antenna element 261 and the 1-2-th antenna element 262, have a phase difference based on a specific beam pattern. For example, the processor 120 may control at least one of the first phase shifter (CH1) 491 and a second phase shifter (CH2) 492 to transmit signals having a phase difference based on a specific beam pattern.

For example, the processor 120 may activate the first phase shifter 491 when signals output from the 2-2-th coupler 472 have a phase difference of 90 degrees. Thus, the processor 120 may shift a phase of a signal, transmitted to the 1-1-th antenna element 261, by 45 degrees such that signals, transmitted to the 1-1-th antenna element 261 and the 1-2-th antenna element 262, have a phase difference of 45 degrees.

In addition, the processor 120 may control at least a portion of a phase shifter (CH3) 493 and a fourth phase shifter (CH4) 494 such that signals, transmitted to the 1-3-th antenna element 263 and the 1-4-th antenna element 264, have a phase difference based on a specific beam pattern. For example, the processor 120 may control at least one of the phase shifter (CH3) 493 and a fourth phase shifter (CH4) 494 to transmit signals having a phase difference based on a specific beam pattern.

For example, the processor 120 may activate the third phase shifter 493 when signals output from the 2-4-th coupler 474 have a phase difference of 90 degrees. Thus, the processor 120 may shift a phase of a signal transmitted to the 1-3-th antennal element 263 such that signals, transmitted to the 1-3-th antenna element 263 and the 1-4-th antenna element 264, have a phase difference of 45 degrees.

Referring to FIG. 4c, the third switching circuit 322 according to an example embodiment includes a fourth sub-switch 504, connected to the first switch circuit 310, and a fifth sub-switch 505 and a sixth sub-switch 506 connected to the fourth sub-switch 504. In this case, the third switching circuit 322 may be referred to as a two-dimensional (2D) Butler matrix.

The processor 120 may transmit a signal, received from the second output terminal 382 of the first switching circuit 310, to the fifth sub-switch 505 or the sixth sub-switch 506 through the fourth sub-switch 504.

In this case, the fourth sub-switch 504 may be referred to as, for example, a single pole double throw (SPDT) switch, but example embodiments are not limited thereto.

The processor 120 may control the fifth sub-switch 505 or the sixth sub-switch 506, receiving a signal from the fourth sub-switch 504, to operate in a single mode, among a plurality of modes.

In this case, each of the fifth sub-switch 505 and the sixth sub-switch 506 may be referred to as a reconfigurable switch operable in a plurality of modes. For example, each of the fifth sub-switch 505 and the sixth sub-switch 506 may be referred to as a reconfigurable switch operating in a switch mode, in which an input signal is output to a single terminal among a plurality of output terminals, or a divider mode in which an input signal is divided and then output to a plurality of output terminals.

It will be appreciated that the configurations of fifth sub-switch 505 and the sixth sub-switch 506 are substantially the same as the configuration of the second sub-switch 502 described above in FIG. 4b. In addition, it will be appreciated that the operation of controlling the fifth sub-switch 505 or the sixth sub-switch 506 by the processor 120 may be performed in the same manner as the operation of controlling the second sub-switch 502 by the processor 120.

Therefore, redundant descriptions of the configurations of the fifth sub-switch 505 and the sixth sub-switch 506 and the operation of controlling the fifth sub-switch 505 or the sixth sub-switch 506 by the processor 120 will be omitted.

Further, the processor 120 may transmit signals having a designated phase difference to the second antenna elements 265 to 268 through a plurality of third couplers 475 to 478 and a plurality of phase shifters 495 to 498.

As described above, the processor 120 may control a phase difference between signals, transmitted to the plurality of antenna elements 261 to 268, using the reconfigurable switches 503, 504, 505, and 506 and the plurality of coupler 471 to 478 included in the second switching circuit 321 and the third switching circuit 322. In addition, the processor 120 may control a phase difference between signals, transmitted to the plurality of antennal elements 261 to 268, using the plurality of phase shifters 491 to 498 connected to the plurality of antennal elements 261 to 268.

Thus, the antenna device 100 according to an example embodiment may increase the number of beam patterns which may be implemented through the antenna array 250. In addition, the antenna device 100 may increase coverage of communication through beamforming performed through the antenna array 250.

FIG. 5 is a lookup table including states of components of an antenna device, based on beam patterns.

Referring to FIG. 5, the antenna device 100 according to an example embodiment may further include a memory storing a lookup table 500 including a plurality of beam patterns.

The lookup table 500 according to an example embodiment may store states of the first switching circuit 310, the second switching circuit 321, the third switching circuit 322, and a plurality of phase shifters 471 to 478, respectively based on the plurality of beam patterns.

In addition, a beam pattern included in the lookup table 500 may include a plurality of components indicating phase differences of signals transmitted to a plurality of antenna elements and directions and slopes of beams with respect to each axis. For example, when a beam pattern of first beam has a component of "1R+2D," the first beam may be formed in a positive direction through signals having a phase difference of 45 degrees with respect to an X-axis. In addition, the first beam may be formed in a negative direction through signals having a phase difference of 90 degrees with respect to a Y-axis.

The processor 120 may control the first switching circuit 310, the second switching circuit 321, the third switching circuit 322, and at least a portion (e.g., at least one) of the plurality of phase shifters 471 to 478 based on a single beam pattern, among a plurality of beam patterns prestored in the lookup table 500.

For example, when a beam pattern has a component of "1R," the antenna device 100 may transmit signals having a phase difference of 45 degrees in a positive direction with respect to the X-axis through the plurality of antenna elements 261 to 268. In addition, when the beam pattern has a component of "3L," the antenna device 100 may transmit signals having a phase difference of 135 degrees in a negative direction through the plurality of antenna elements 261 to 268.

To this end, the processor 120 may control the first switching circuit 310 and at least a portion (e.g., at least one) of the plurality of phase shifters 471 to 478. For example, the processor 120 may control the first switching circuit 310 and at least a portion (e.g., at least one) of the plurality of phase shifters 471 to 478 to operate in a switch mode in which the input terminal 411 of the first reconfigurable switch 410 is connected to the first output terminal 412 of the first reconfigurable switch 410. In addition, the processor 120 may activate the first phase shifter (CH1) 491 and the third phase shifter (CH3) 493.

In addition, when the beam pattern has a component of "2U," the antenna device 100 may transmit signals having a phase difference of 90 degrees in a positive direction with respect to a Y-axis through the plurality of antenna elements 261 to 268. To this end, the processor 120 may control the second switching circuit 321 and the third switching circuit 322. For example, the processor 120 may control the second switching circuit 321 and the third switching circuit 322 to operate in a switch mode. For example, the processor 120 may control the second switch mode to operate in a switch mode in which the input terminal 611 of the second sub-switch 502 is connected to the first output terminal 612 of the second sub-switch 502.

As another example, when the beam pattern has a component of "1L," the antenna device 100 may transmit signals having a phase difference of 45 degrees in a negative direction with respect to the X-axis through the plurality of antenna elements 261 to 268. In addition, when the beam pattern has a component of "3R," the antenna device 100 may transmit signals having a phase difference of 135 degrees in a positive direction with respect to the X-axis through the plurality of antennal elements 261 to 268.

To this end, the processor 120 may control the first switching circuit 310 and at least a portion of the plurality of phase shifters 471 to 478. For example, the processor 120 may control the first switching circuit 310 and at least a portion of the plurality of phase shifters 471 to 478 to operate in a switch mode in which the input terminal 411 of the first reconfigurable switch 410 is connected to the second output terminal 413 of the first reconfigurable switch 410. In addition, the processor 120 may activate the second phase shifter (CH2) 492 and the fourth phase shifter (CH4) 494.

In addition, when the beam pattern has a component of "2D," the antenna device 100 may transmit signals having a phase difference of 90 degrees in a negative direction with respect to the Y-axis through the plurality of antenna elements 261 to 268. To this end, the processor 120 may control the second switching circuit 321 and the third switching circuit 322 to operate in a switch mode. For example, the processor 120 may control the second switching circuit 321 to operate in a switch mode in which the input terminal 611 of the second sub-switch 502 is connected to the second output terminal 613.

As another example, when the beam pattern has a component of "2R" or "2L," the antenna device 100 may transmit signals having a phase difference of 45 degrees with respect to the X-axis through the plurality of antenna elements 261 to 268. To this end, the processor 120 may control the first switching circuit 310 to operate in a divider mode.

In addition, when the beam pattern has a component of "M," the antenna device 100 may transmit signals having the same phase with respect to a Y-axis through a plurality of antenna elements 261 to 268. Thus, the antenna device 100 may form a beam in a direction, perpendicular to the Y-axis. To this end, the processor 120 may control the second switching circuit 321 and the third switching circuit 322 to operate in a divider mode.

For example, the processor 120 may control at least a portion (e.g., at least one) of the first reconfigurable switch 410 and the plurality of phase shifters 471 to 478 included in the first switching circuit 310 such that antenna elements disposed in a first direction (for example, a positive X-direction), among the plurality of antenna elements 261 to 268, transmit signals having a first phase difference (for example, 45 degrees, 90 degrees, or 135 degrees).

In addition, the processor 120 may control reconfigurable switches 503, 504, 505, and 506 included in the second switching circuit 321 and the third switching circuit 322 such that antenna elements disposed in a second direction (for example, a positive Y-direction), among the plurality of antenna elements 261 to 268, transmit signals having a second phase difference (for example, 0 degree, 45 degrees, or 90 degrees).

However, states of the components of the antenna device 100 based on a plurality of beam patterns stored through the lookup table 500 is not limited to the above-described example and may be referenced as various states for forming a beam according to the components of the beam pattern.

As described above, the antenna device 100 according to an example embodiment may form a beam corresponding to a single pattern, among a plurality of predetermined beam patterns, through the plurality of switching circuits 310, 321, and 322 and the plurality of phase shifters 471 to 478 operable in a plurality of modes.

Through such a configuration, the antenna device 100 according to an example embodiment may increase the number of beam patterns which may be implemented through the plurality of antenna elements 261 to 268. Furthermore, the antenna device 100 may increase coverage of wireless communication through a beam formed through the plurality of antenna elements 261 to 268.

FIG. 6 is a flowchart illustrating an example of a method of transmitting a signal having a designated beam pattern by the antenna device of FIG. 1.

Referring to FIG. 6, the processor 120 according to an example embodiment may transmit a signal having a single beam pattern, among a plurality of predetermined beam patterns.

For example, the processor 120 may feed or supply power to the plurality of antenna elements 261 to 268 (or the antenna array 250) through the first switching circuit 310, the second switching circuit 321, and the third switching circuit 322. Thus, the processor 120 may transmit a signal having a specific beam pattern through the plurality of antenna elements 261 to 268.

In operation S10, the processor 120 selects a single pattern from among a plurality of predetermined beam patterns. For example, referring to FIG. 5 together, the processor 120 may select a single beam pattern from among a plurality of beam patterns stored in the lookup table 500.

The processor 120 may select one of the plurality of beam patterns based on a state of the antenna device 100 or a state of communication with an external network.

As an example, the processor 120 selects a single beam pattern from among plurality of beam patterns based on a signal (for example, a radio resource control (RRC) message) received from a base station through the plurality of antenna elements 261 to 268.

As another example, the processor 120 may select a single beam pattern from among a plurality of beam patterns based on a control according to predetermined software (or programs). In this case, the software may include a beam pattern set based on the state of the antenna device 100.

As another example, the processor 120 may select one beam pattern from among a plurality of beam patterns based on an input received from an electrically connected component (for example, an auxiliary processor or an application processor).

However, the operation of selecting the single beam pattern from among the plurality of beam patterns by the processor 120 is not limited to the above-described example.

In operation S20, the processor 120 controls the first switching circuit 310 to operate in a single mode, among a plurality of modes, based on the selected beam pattern. For example, the processor 120 may control the first reconfigurable switch 410, included in the first switching circuit 310, to operate in either one of a switch mode and a divider mode based on the selected beam pattern.

As an example, when the selected beam pattern has the component of "1R" or "3L," the processor 120 may control the first reconfigurable switch 410 to operate in the switch mode. In this case, the processor 120 may control the input terminal 411 of the first reconfigurable switch 410 to be connected to the first output terminal 412.

As another example, when the selected beam pattern has the component of "2L," the processor 120 may control the first reconfigurable switch 410 to operate in the divider mode.

In operation S30, the processor 120 controls the second switching circuit 321 and the third switching circuit 322 to operate in a single mode, among the plurality of modes, based on the selected beam pattern. For example, the processor 120 may control at least a portion (e.g., at least one) of the reconfigurable switches 502, 503, 505, and 506, included in the second switching circuit 321 and the third switching circuit 322, to operate in either one of the switch mode and the divider mode based on the selected beam pattern.

As an example, when the selected beam pattern has a component of "2U" or "2D," the processor 120 may control reconfigurable switches, included in the second switching circuit 321 and the third switching circuit 322, to operate in the switch mode.

As another example, when the selected beam pattern has a component of "M," "1U," or "1D," the processor 120 may control reconfigurable switches, included in the second switching circuit 321 and the third switching circuit 322, to operate in the divider mode.

Further, the processor 120 may operate at least a portion (e.g., at least one) of the plurality of phase shifters disposed between the second switching circuit 321 and the third switching circuit 322, and the antenna array 250. Thus, the processor 120 may control a phase difference between signals transmitted to the plurality of antenna elements 261 to 268.

In operation S40, the processor 120 may feed power to the antenna array 250 through an electrical path including the first switching circuit 310, the second switching circuit 321, and the third switching circuit 322. Thus, the antenna device 100 may transmit a signal having the selected beam pattern.

During the method of FIG. 6, electrical paths for the respective antenna elements 261 to 268, included in the antenna array 250, may have the same electrical length.

As described above, the processor 120 may control a reconfigurable switch, included in the first switching circuit 310, such that antenna elements disposed in the first direction, among the plurality of antenna elements 261 to 268, transmit signals having the first phase difference.

In addition, the processor 120 may control reconfigurable switches, included in the second switching circuit 321 and the third switching circuit 322, such that antenna elements disposed in a second direction intersecting the first direction, among the plurality of antenna elements 261 to 268, transmit signals having the second phase difference.

Through the above-described configuration, the antenna device 100 according to an example embodiment may transmit a signal having a beam pattern, selected from among the plurality of beam patterns, using a switching circuit operating in a plurality of modes.

Accordingly, the antenna device 100 according to an example embodiment may increase the number of beam patterns which may be implemented through the antenna array 250. Also, the antenna device 100 may increase coverage of wireless communication through beamforming performed through the antenna array 250.

FIG. 7a is a diagram illustrating a configuration in which an antenna device according to an example embodiment is disposed on an electronic device to transmit a signal having a single beam pattern, among a plurality of beam patterns. FIG. 7b is a diagram illustrating that the plurality of beam patterns of FIG. 7a are formed with respect to a first axis. FIG. 7c is a diagram illustrating that the plurality of beam patterns of FIG. 7a are formed with respect to a second axis.

Referring to FIG. 7a, an electronic device 10 according to an example embodiment includes a first antenna device 101 disposed toward a rear surface 11 of the electronic device 10, and a second antenna device 102 disposed toward a side surface 12 of the electronic device 10.

For example, the electronic device 10 may include a first antenna device 101 in which a plurality of antenna elements 701 are disposed toward the rear surface 11 of the electronic device 10. Also, the electronic device 10 may include a second antenna device 102 disposed in which a plurality of antenna elements 702 are disposed toward the side surface 12 of the electronic device 10.

In an embodiment, the first antenna device 101 and the second antenna device 102 have substantially the same configuration.

The first antenna device 101 may form or emit at least one beam in a direction (for example, a positive Z-direction) from the inside of the electronic device 10 toward the rear surface 11. For example, the first antenna device 101 disposed toward the rear surface 11 of the electronic device 10 may form or emit at least one beam, among a plurality of beams 700 having different beam patterns.

The second antenna device 102 may form or emit at least one beam in a direction from the inside of the electronic device 10 toward the side surface 12 (for example, a negative Y-direction).

Referring to FIG. 7b, the first antenna device 101 according to an example embodiment forms or emit a plurality of beams having a constant angle with respect to a first axis (for example, an X-axis).

As an example, the first antenna device 101 may transmit signals having a phase difference of 45 degrees in a positive direction with respect to the X-axis through the plurality of antenna elements 701. Thus, the first antenna device 101 may form or emit a beam having a component of "1R" with respect to the X-axis.

As another example, the first antenna device 101 may transmit signals having a phase difference of 90 degrees in a negative direction with respect to the X-axis through the plurality of antenna elements 701. Thus, the first antenna device 101 may form or emit a beam having a component of "2L" with respect to the X-axis.

As another example, the first antenna device 101 may transmit signals having a phase difference of 135 degrees in a negative direction with respect to the X-axis through the plurality of antenna elements 701. Thus, the first antenna device 101 may form or emit a beam having a component of "3L" with respect to the X-axis.

Referring to FIG. 7c, the first antenna device 101 according to an example embodiment may form or emit a plurality of beams having a constant angle with respect to a second axis (for example, a Y-axis).

As an example, the first antenna device 101 may transmit signals having a phase difference of 45 degrees in a positive direction with respect to the Y-axis through a plurality of antenna elements 702. Thus, the first antenna device 101 may form or emit a beam having a component of "1U" with respect to the Y-axis.

As another example, the first antenna device 101 may transmit signals having a phase difference of 90 degrees in a negative direction with respect to the Y-axis through the plurality of antenna elements 702. Thus, the first antenna device 101 may form or emit a beam having a component of "2D" with respect to the Y-axis.

As another example, the first antenna device 101 may transmit signals having the same phase with respect to the Y-axis through the plurality of antenna elements 702. Thus, the first antenna device 101 may form a beam having a component of "M" with respect to the Y-axis.

Through the above-described configuration, the antenna devices 101 and 102 according to example embodiments may form at least one beam, among a plurality of beams having at least 22 different beam patterns. Thus, the antenna devices 101 and 102 according to example embodiments may increase coverage of wireless communication through beamforming.

FIG. 8a is a diagram illustrating beam patterns, formed to be perpendicular to a second axis, among the plurality of beam patterns of FIG. 7a. FIG. 8b is a diagram illustrating beam patterns, formed to have a first angle with respect to a second axis, among the plurality of beam patterns of FIG. 7a. FIG. 8c is a diagram illustrating beam patterns formed to have a second angle with respect to a second axis, among the plurality of beam patterns of FIG. 7a. FIG. 8d is a diagram illustrating beam patterns, formed to have a third angle with respect to a first axis, among the plurality of beam patterns of FIG. 7a.

Referring to FIG. 8a, the antenna devices 101 and 102 according to an embodiment may form or emit a plurality of beams, perpendicular to a second axis (for example, a Y-axis). For example, the antenna devices 101 and 102 may transmit signals having a designated phase difference (for example, 45 degrees, 90 degrees, or 135 degrees) with respect to the X-axis through the plurality of antenna elements 701 and 702. Thus, the antenna devices 101 and 102 may form or emit a plurality of beams perpendicular to the Y-axis and having a designated angle with respect to the X-axis.

Referring to FIG. 8b, the antenna devices 101 and 102 according to an example embodiment may form or emit a plurality of beams having a first angle with respect to a second axis (for example, a Y-axis). For example, the antenna devices 101 and 102 may transmit signals having a phase difference of 45 degrees with respect to the Y-axis and a designated phase difference (for example, 90 degrees) with respect to an X-axis through the plurality of antenna elements 701 and 702. Thus, the antenna devices 101 and 102 may form or emit a plurality of beams having a component of "1U" with respect to the Y-axis and a designated angle with respect to the X-axis.

Referring to FIG. 8c, the antenna devices 101 and 102 according to an embodiment may form or emit a plurality of beams having a second angle with respect to a second axis (for example, a Y-axis). For example, the antenna devices 101 and 102 may transmit signals having a phase difference of 90 degrees with respect to the Y-axis and a designated phase difference (for example, 45 degrees, 90 degrees, or 135 degrees) with respect to an X-axis through the plurality of antenna elements 701 and 702. Thus, the antenna devices 101 and 102 may form or emit a plurality of beams having a component of "2U" with respect to the Y-axis and a designated angle with respect to the X-axis.

Referring to FIG. 8d, the antenna devices 101 and 102 according to an example embodiment may form or emit a plurality of beams having a third angle with respect to a first axis (for example, an X-axis). For example, the antenna devices 101 and 102 may transmit signals having a phase difference of 90 degrees with respect to the X-axis and a designated phase difference with respect to a Y-axis (for example, 0 degrees, 45 degrees, or 90 degrees) through the plurality of antenna elements 701 and 702. Thus, the antenna devices 101 and 102 may form or emit a plurality of beams having a component of "2R" with respect to the X-axis and a designated angle with respect to the Y-axis.

As described above, the antenna devices 101 and 102 according to example embodiments may form or emit at least a portion of a plurality of beams having different patterns using a plurality of switching circuits connected to a plurality of antenna elements. For example, the antenna devices 101 and 102 may form or emit at least 22 beams having different patterns using a plurality of switching circuits connected to the plurality of antenna elements 701 and 702.

Thus, the antenna devices 101 and 102 according to example embodiments may increase the number of beam patterns which may be implemented through a plurality of antenna elements. Furthermore, the antenna device 100 may increase coverage of wireless communication through a beam formed through the plurality of antenna elements.

FIG. 9a is a diagram illustrating a first surface of a printed circuit board included in the antenna device of FIG. 1. FIG. 9b is a diagram illustrating a second surface of a printed circuit board included in the antenna device of FIG. 1. FIG. 9c is a cross-sectional view of the printed circuit board of FIG. 9a, taken along line A-A'.

Referring to FIGS. 9a to 9c together, in an example embodiment, the antenna device 100 may include a printed circuit board 20, first antenna elements 251, second antenna elements 252, a first switching circuit 310, a second switching circuit 321, and a third switching circuit 322. However, among the components of the antenna device 100, the same components or substantially the same components as the above-described components are represented by the same reference numerals, and redundant descriptions thereof will be omitted.

The printed circuit board 20 may include a plurality of conductive layers and a plurality of non-conductive layers stacked alternately with the plurality of conductive layers. As shown in FIG. 9c, the printed circuit board 20 may provide an electrical connection between the printed circuit board 20 and/or various electronic components disposed outside the printed circuit board 20 using wirings and conductive vias 371 and 372 formed in the conductive layers.

Referring to FIG. 9a, a plurality of antenna elements 261 to 268 included in the antenna arrays 251 and 252 may be formed on a first surface 21 of the printed circuit board 20.

According to another embodiment, the antenna array 250 may be formed inside the printed circuit board 20. For example, the antenna array 250 may be fully surrounded by the printed circuit board 20. In addition, it will be appreciated that the antenna array 250 may include a plurality of antenna arrays (for example, a dipole antenna array and/or a patch antenna array) which are different or the same in shape or type. However, the antenna array 250 according to example embodiments is described as a patch antenna array.

In this case, the plurality of antenna elements 261 to 268 included in the antenna arrays 251 and 252 may be arranged in a 4-by-2 array. For example, the antenna arrays 251 and 252 may include a plurality of first antenna elements 261 to 264 arranged in a 2-by-2 array and a plurality of second antenna elements 265 to 268 arranged in a 2-by-2 array.

Referring to FIG. 9b, the first switching circuit 310, the second switching circuit 321, and the third switching circuit 322 may be disposed on a second surface 22 of the printed circuit board 20, parallel to the first surface 21 of the printed circuit board 20. For example, the first surface 21 may oppose the second surface 22.

In this case, the first switching circuit 310 may be connected to the second switching circuit 321 and the third switching circuit 322. For example, the first switching circuit 310 may be connected to the second switching circuit 321 and the third switching circuit 322 while having the same electrical length as the second switching circuit 321 and the third switching circuit 322, but example embodiments are not limited thereto.

The first switching circuit 310, the second switching circuit 321, and the third switching circuit 322 may be connected to the processor 120 through the printed circuit board 20.

Referring to FIGS. 9a and 9b together, the second switching circuit 321 may be disposed in a position (for example, P1) corresponding to a central point (or a center) P1' of the first antenna elements 261 to 264. For example, the second switching circuit 321 may be disposed in a position (for example, P1) corresponding to the central point P1' of the first antenna elements 261 to 264 on the second surface 22 of the printed circuit board 20.

The third switching circuit 322 may be disposed in a position (for example, P2) corresponding to a central point (or a center) P2' of the second antenna elements 265 to 268. For example, the third switching circuit 322 may be disposed in a position (for example, P2) corresponding to the central point P2' of the second antenna elements 265 to 268 on the second surface 22 of the printed circuit board 20.

Referring to FIGS. 9a and 9c together, the second switching circuit 321 may be connected to the first antenna elements 251 through a first conductive via 371, and the third switching circuit 322 may be connected to the second antenna elements 252 through a second conductive via 372.

In this case, the first conductive via 371 and the second conductive via 372 may be formed through the printed circuit board 20.

According to an example embodiment, the second switching circuit 321 may be connected to the central point P1' of the first antenna elements 251. Also, the third switching circuit 322 may be connected to the central point P2' of the second antenna elements 252.

For example, the second switching circuit 321 may be connected to the first antenna elements 251 through the first conductive via 371 connected to the central point P1' of the first antenna elements 261 to 264. In addition, the third switching circuit 322 may be connected to the second antenna elements 252 through the second conductive via 372 connected to the central point P2' of the second antenna elements 265 to 268.

Through the above-described configuration, the antenna device 100 according to example embodiments may secure a feeding path of the same length from a power supply (for example, power management integrated circuit (PMIC)) to the plurality of antenna elements 261 to 268. Thus, the antenna device 100 according to example embodiments may significantly reduce process requirements for adjusting the feeding path.

In addition, through the above-described configuration, the antenna device 100 according to example embodiments may significantly reduce a length of a feeding path from the switching circuit 321 and 322 to a plurality of antenna elements 261 to 268 included in the antenna array 251 and 252. Thus, the antenna device 100 according to example embodiments may significantly reduce path loss caused by the feeding path.

As described above, the antenna device 100 according to example embodiments may increase the number of beam patterns which may be implemented as a plurality of antenna elements using a reconfigurable switch operating in a plurality of modes. Thus, the antenna device 100 may increase coverage of wireless communication through beamforming using the plurality of antenna elements.

In addition, the antenna device 100 according to example embodiments may significantly reduce a feeding path for a plurality of antenna elements using a switching circuit disposed in a center of the plurality of antenna elements. Thus, the antenna device 100 according to example embodiments may significantly reduce path loss caused by the feeding path.

In addition, the antenna device 100 according to example embodiments may secure the same feeding path for a plurality of antenna elements using a switch circuit disposed in the center of the plurality of antenna elements. As a result, the antenna device 100 according to example embodiments may significantly reduce costs for a process of forming a feeding path.

As set forth above, the antenna device according to example embodiments may increase coverage of wireless communication through an antenna array using a feeding path including a reconfigurable switch.

While example embodiments have been shown and described above, it will be apparent to those skilled in the art that modifications and variations could be made without departing from the scope of the present inventive concept as defined by the appended claims.

What is claimed is:

1. An antenna device comprising:
an antenna array comprising a plurality of first antenna elements arranged in a 2-by-2 array, and a plurality of second antenna elements arranged in a 2-by-2 array;
a first switching circuit;
a second switching circuit connected to the first switching circuit and the first antenna elements;
a third switching circuit connected to the first switching circuit and the second antenna elements; and
a processor connected to the first switching circuit, the second switching circuit, and the third switching circuit,
wherein the processor is configured to:
control at least one of the first switching circuit, the second switching circuit, and the third switching circuit to operate in a single mode, among a plurality of modes, based on a single beam pattern among a plurality of predetermined beam patterns; and
feed power to the antenna array through the first switching circuit, the second switching circuit, and the third switching circuit, to transmit a signal having the beam pattern.

2. The antenna device of claim 1, further comprising:
a plurality of phase shifters disposed between the second switching circuit and the first antenna elements and between the third switching circuit and the second antenna elements,
wherein the processor is configured to control at least one of the plurality of phase shifters based on the beam pattern among the plurality of beam patterns.

3. The antenna device of claim 2, wherein the plurality of modes comprise a switch mode, in which an input terminal is connected to a single output terminal among a plurality of output terminals, and a divider mode in which the input terminal is connected to the plurality of output terminals.

4. The antenna device of claim 3, wherein
the first switching circuit comprises a first reconfigurable switch, and
the processor controls the first reconfigurable switch to operate in a single mode among the plurality of modes, such that the first antenna elements and the second antenna elements transmit signals having a first phase difference, and activates at least one of the plurality of phase shifters.

5. The antenna device of claim 4, wherein
the first switching circuit further comprises a first coupler connected to the first reconfigurable switch,
the first switching circuit outputs signals having a phase difference of 90 degrees through the first coupler when the first reconfigurable switch operates in the switch mode, and
the first switching circuit outputs signals having a phase difference of 180 degrees through the first coupler when the first reconfigurable switch operates in the divider mode.

6. The antenna device of claim 4, wherein
the second switching circuit comprises a second reconfigurable switch, and
the processor controls the second reconfigurable switch to operate in a single mode among the plurality of modes, such that antenna elements disposed in a second direction intersecting the first direction among the first antenna elements, transmit signals having a second phase difference, and activates at least one of the plurality of phase shifters.

7. The antenna device of claim 6, wherein
the third switching circuit comprises a third reconfigurable switch, and
the processor operates the third reconfigurable switch in a single mode among the plurality of modes, such that antenna elements disposed in the second direction, among the second antenna elements, transmit a signal having the second phase difference.

8. The antenna device of claim 6, wherein
the second reconfigurable switch further comprises a first sub-switch connected to the first switching circuit, and a second sub-switch and a third sub-switch, and
the process is configured to:
connect the first switching circuit to one of the second sub-switch and the third sub-switch through the first sub-switch; and
control the second sub-switch or the third sub-switch to operate in a single mode, among the plurality of modes, such that a signal output from the first switching circuit has the first phase difference and the second phase difference and is transmitted to the first antenna elements.

9. The antenna device of claim 2, further comprising:
a memory configured to store a lookup table comprising states of the first switching circuit, the second switching circuit, the third switching circuit, and the plurality of phase shifters, respectively corresponding to the plurality of beam patterns, and
wherein the processor controls at least one of the first switching circuit, the second switching circuit, the third switching circuit, and the plurality of phase shifters such that the antenna array transmits a signal having a single beam pattern, among the plurality of beam patterns, based on the lookup table stored in the memory.

10. The antenna device of claim 1, wherein
the second switching circuit is disposed in a position corresponding to a center of the first antenna elements, and
the third switching circuit is disposed in a position corresponding to a center of the second antenna elements.

11. An electronic device comprising an antenna device, the electronic device comprising:
a printed circuit board;
an antenna array disposed on a first surface of the printed circuit board;
a first switching circuit, a second switching circuit, and a third switching circuit disposed on a second surface of the printed circuit board that opposes the first surface; and
a processor configured to control the first switching circuit, the second switching circuit, and the third switching circuit such that the antenna array transmits a signal having a single beam pattern, among a plurality of predetermined beam patterns,
wherein
the antenna array comprises a plurality of first antenna elements, disposed in a 2-by-2 array, and a plurality of second antenna elements disposed in a 2-by-2 array,
the first switching circuit is connected to the second switching circuit and the third switching circuit through a first reconfigurable switch,
the second switching circuit is connected to the first antenna elements through a central point of the first antenna elements on the first surface, and
the third switching circuit is connected to the second antenna elements through a central point of the second antenna elements on the first surface.

12. The electronic device of claim 11, further comprising:
a first conductive via connecting the first antenna elements and the second switching circuit to each other through an inside of the printed circuit board; and
a second conductive via connecting the second antenna elements and the third switching circuit to each other through an inside of the printed circuit board.

13. The electronic device of claim 12, wherein
the second switching circuit is disposed in a position, corresponding to a central point of the first antenna elements, on the second surface, and
the third switching circuit is disposed on a position, corresponding to a central point of the second antenna elements, on the second surface.

14. The electronic device of claim 11, further comprising:
a plurality of phase shifters disposed between the second switching circuit and the first antenna elements and between the third switching circuit and the second antenna elements,
wherein the processor controls the first switching circuit and at least one of the plurality of phase shifters such that antenna elements disposed in a first direction, among the first antenna elements and the second antenna elements, transmit signals having a first phase difference.

15. The electronic device of claim 14, wherein the processor controls the second switching circuit and the third switching circuit such that antenna elements disposed in a second direction intersecting the first direction, among the first antenna elements and the second antenna elements, transmit signals having a second phase difference.

16. A wireless communication method comprising:
selecting a single beam pattern, among a plurality of predetermined beam patterns;
operating a first switching circuit in a single mode, among a plurality of modes, based on the selected beam pattern;
operating a second switching circuit and a third switching circuit connected to the first switching circuit in a single mode, among the plurality of modes, based on the selected beam pattern; and
feeding power to an antenna array through the first switching circuit, the second switching circuit, and the third switching circuit, to transmit a signal having the selected beam pattern,
wherein the plurality of modes comprise a switch mode, in which an input terminal is connected to a single output terminal among a plurality of output terminals, and a divider mode in which the input terminal is connected to the plurality of output terminals, and
each of the first switching circuit, the second switching circuit, and the third switching circuit outputs a combination of three or more different types of signals through the plurality of modes.

17. The wireless communication method of claim 16, further comprising:
operating at least one of a plurality of phase shifters, disposed between the second switching circuit and the antenna array and between the third switching circuit and the antenna array, based on the selected beam pattern.

18. The wireless communication method of claim 16, wherein
the second switching circuit comprises a first sub-switch, a second sub-switch, and a third sub-switch,
the wireless communication method further comprising:
connecting the first switching circuit to the second sub-switch or the third sub-switch through the first sub-switch based on the selected beam pattern; and
operating one of the second sub-switch and the third sub-switch, connected to the first switching circuit, in a single mode among the plurality of modes, based on the selected beam pattern.

19. The wireless communication method of claim 16, comprising:
transmitting a signal having a phase difference of 180 degrees to each of the second switching circuit and the third switching circuit when the first switching circuit operates in the divider mode.

20. The wireless communication method of claim 16, wherein
signals, transmitted through antenna elements disposed in a first direction, among antenna elements included in the antenna array, have a first phase difference, and
signals, transmitted through antenna elements disposed in a second direction intersecting the first direction, among the antenna elements, have a second phase.

* * * * *